US005522775A

United States Patent [19]
Maruyama et al.

[11] Patent Number: 5,522,775
[45] Date of Patent: Jun. 4, 1996

[54] SPEED CHANGE GEAR CONTROL SYSTEM FOR HYDROSTATIC-MECHANICAL TRANSMISSIONS

[75] Inventors: Ryoichi Maruyama, Kanagawa; Tsutomu Ishino, Osaka, both of Japan

[73] Assignee: Kabushiki Kaisha Komatsu Seisakusho, Tokyo, Japan

[21] Appl. No.: 343,261

[22] Filed: Oct. 18, 1994

[30] Foreign Application Priority Data

Oct. 18, 1993 [JP] Japan ..................................... 5-260160

[51] Int. Cl.⁶ ................................................. F16H 47/04
[52] U.S. Cl. ................................. 475/76; 475/80; 477/68
[58] Field of Search ............................. 74/731.1, 733.1; 475/76, 78, 80, 117, 123; 477/68, 70, 76, 80

[56] References Cited

U.S. PATENT DOCUMENTS

| | | | |
|---|---|---|---|
| 3,990,327 | 11/1976 | Margolin | 475/80 |
| 4,043,227 | 8/1977 | Beals et al. | |
| 4,068,543 | 1/1978 | Sakai et al. | |
| 4,309,917 | 1/1982 | Leet. | |
| 5,052,986 | 10/1991 | Jarchow et al. | 475/76 |
| 5,406,793 | 4/1995 | Maruyama et al. | 475/76 X |

FOREIGN PATENT DOCUMENTS 63-30654  2/1988  Japan .
1-30650  6/1989  Japan .

Primary Examiner—Charles A. Marmor
Assistant Examiner—Peter Kwon
Attorney, Agent, or Firm—Armstrong, Westerman, Hattori, McLeland & Naughton

[57] ABSTRACT

A speed change gear control system, wherein gear shift control for shifting the transmission from an arbitrary speed range into a higher speed range which provides higher absolute speed than the arbitrary speed range is performed, provided that the actual speed ratio e of the transmission satisfies $|E_1|<|e|<|E_0|$ where $E_0$ is a speed ratio for a shifting point at which the transmission is shifted from the arbitrary speed range into the higher speed range; and $E_1$ is a specified speed ratio, or provided that $|e|+ (\Delta e/\Delta t)\times T_1 > |E_0|-\Delta E_1$ where $\Delta e$ is an increase in the speed ratio e over a period of time $\Delta t$; $T_1$ is the filling time required for supplying hydraulic oil to a clutch which shifts the transmission from the arbitrary speed range to the higher speed range; and $\Delta E_1$ is a specified small speed ratio.

21 Claims, 10 Drawing Sheets

SPEED CHANGE GEAR CONTROL SYSTEM FOR HYDROSTATIC-MECHANICAL TRANSMISSIONS

BACKGROUND OF THE INVENTION (1) Field of the Invention

The invention relates to a speed change gear control system for use in a hydrostatic-mechanical transmission which is equipped with a mechanical transmission unit actuated through an input shaft connectable to a power source; a hydrostatic transmission unit which is connectable to the input shaft and comprises a pump and motor having their respective discharge setting swash plates, the angle of at least either of the swash plates being variable; and a differential unit for actuating both the mechanical transmission unit and the hydrostatic transmission unit by connecting an output shaft thereto.

(2) Description of the Prior Art

One known clutch shift control method for hydrostatic-mechanical transmissions of the above type is disclosed in Japanese Patent Publication 1-30650 (1989). According to the clutch shift control method taught by this publication, relative revolution speed with respect to the disc plate is calculated for the clutch for either a higher speed range or lower speed range than the presently selected speed range. When the relative revolution speed thus calculated becomes a predetermined value or less, a gear shift instruction signal is generated to start the engagement of the higher speed clutch or lower speed clutch. Simultaneously with the engagement, the discharge volume of the pump in the hydrostatic-mechanical transmission is so controlled that the relative revolution speed of the higher or lower speed clutch comes into close proximity to zero. Then, it is determined from a signal sent from the higher or lower speed clutch whether the engagement of the clutch has been completed. If so, the disengagement of the clutch presently engaged starts, and thus the clutch shift control is completed.

SUMMARY OF THE INVENTION

The prior art clutch shift control method as described above, however, has the following disadvantages:

(1) During shifting of a clutch, the piston for actuating the clutch is filled with hydraulic oil and the speed ratio of the hydrostatic-mechanical transmission is kept constant during this filling time. Therefore, the acceleration or deceleration of the vehicle is interrupted.

(2) Since the determination as to whether the engagement of a clutch has been completed is based on a signal from a hydraulic switch, the clutch shift control cannot be performed in the event of a failure of the hydraulic switch.

(3) When vehicle speed is in proximity to a clutch shifting point owing to running resistance, speed ranges vary undesirably with a small change in running resistance (i.e., hunting phenomenon).

(4) Once the clutch shift control is started, other controls cannot be commenced until the clutch shift control has been completed. For example, if the forward/reverse drive change lever is operated during upshift, the following procedure is required. The clutch shift control for downshift is started upon completion of the clutch shift control for upshift, and then, speed ratio is decreased. Since the clutch shift control has to be performed two times in this case, time losses are entailed, causing a delay in deceleration. Similarly, a delay is caused in deceleration if load abruptly exerts on the vehicle and therefore the speed ratio has to be reduced.

The present invention has been made in order to overcome the foregoing problems and therefore one of the objects of the invention is to provide a speed change gear control system for a hydrostatic-mechanical transmission in which gear shifting can be carried out without interrupting the acceleration or deceleration of the vehicle, and not only abnormal changes in speed ranges (i.e., hunting) but also undesirable time loses during gear shifting can be prevented.

In accomplishing these and other objects, there is provided, in accordance with the first aspect of the invention, a speed change gear control system for use in a hydrostatic-mechanical transmission which is equipped with a mechanical transmission unit actuated through an input shaft connectable to a power source; a hydrostatic transmission unit which is connectable to the input shaft and comprises a pump and motor having their respective discharge setting swash plates, the angle of at least either of the swash plates being variable; and a differential unit for actuating both the mechanical transmission unit and the hydrostatic transmission unit by connecting an output shaft thereto, the system comprising:

shift control means for performing gear shifting for shifting the transmission from an arbitrary speed range into a higher speed range which provides higher absolute speed than the arbitrary speed range, provided that the actual speed ratio e of the transmission satisfies $|E_0|>|e|>|E_1|$ where $E_0$ is a speed ratio for a shifting point at which the transmission is shifted from the arbitrary speed range into the higher speed range; and $E_1$ is a speed ratio in proximity to the speed ratio $E_0$, which is for a point at which the relative revolution speed of a clutch with respect to a disc plate is not more than a specified small value.

In the first form of the invention, when shifting the transmission from an arbitrary speed range into a higher speed range, gear shifting is performed at the time the relative revolution speed of a clutch to be engaged with respect to a disc plate is in close proximity to zero. Therefore, gear shifting can be performed without interrupting the acceleration of the vehicle, so that the time during which acceleration is interrupted can be reduced. In addition, a shock due to speed change at the time of gear shifting and a breakage of the clutch can be positively prevented.

According to the second aspect of the invention, there is provided a speed change gear control system for use in a hydrostatic-mechanical transmission which is equipped with a mechanical transmission unit actuated through an input shaft connectable to a power source; a hydrostatic transmission unit which is connectable to the input shaft and comprises a pump and motor having their respective discharge setting swash plates, the angle of at least either of the swash plates being variable; and a differential unit for actuating both the mechanical transmission unit and the hydrostatic transmission unit by connecting an output shaft thereto, the system comprising:

shift control means for performing gear shifting for shifting the transmission from an arbitrary speed range into a higher speed range which provides higher absolute speed than the arbitrary speed range, provided that $|e|+(\Delta e/\Delta t)\times T_1>|E_0|-\Delta E_1$, where $\Delta e$ ($\Delta e>0$) is an increase in the absolute value of the actual speed ratio e of the transmission over a period of time $\Delta t$; $T_1$ is a filling time required for supplying hydraulic oil to a clutch which shifts the transmission from the arbitrary speed range to the higher speed range; and $\Delta E_1$ is a specified small speed ratio.

In the second form of the invention, when shifting the transmission from an arbitrary speed range into a higher speed range, a point at which the relative revolution speed ratio of a clutch to be engaged is in close proximity to zero is estimated from an increase $\Delta e$ in the absolute value of the actual speed ratio e and from the filling time for the clutch to be engaged, and the clutch shift control is performed by changing the speed ratio even during the filling time of hydraulic oil. Therefore, the clutch presently engaged can be disengaged almost simultaneously with the engagement of the next clutch, thereby reducing the acceleration interrupting time. In addition, a shock due to speed change at the time of gear shifting and a breakage of the clutch can be positively prevented.

According to the third aspect of the invention, there is provided a speed change gear control system for use in a hydrostatic-mechanical transmission which is equipped with a mechanical transmission unit actuated through an input shaft connectable to a power source; a hydrostatic transmission unit which is connectable to the input shaft and comprises a pump and motor having their respective discharge setting swash plates, the angle of at least either of the swash plates being variable; and a differential unit for actuating both the mechanical transmission unit and the hydrostatic transmission unit by connecting an output shaft thereto, the system comprising:

shift control means for performing gear shifting for shifting the transmission from an arbitrary speed range into a higher speed range which provides higher absolute speed than the arbitrary speed range, provided that the actual speed ratio e of the transmission satisfies $|E_0|>|e|>|E_1|$, where $E_0$ is a speed ratio for a shifting point at which the transmission is shifted from the arbitrary speed range into the higher speed range; and $E_1$ is a speed ratio in proximity to the speed ratio $E_0$, which is for a point at which the relative revolution speed of a clutch with respect to a disc plate is not more than a specified small value, or provided that $|e|+(\Delta e/\Delta t) \times T_1 > |E_0|-\Delta E_1$, where $\Delta e$ ($\Delta e>0$) is an increase in the absolute value of the actual speed ratio e of the transmission over a period of time $\Delta t$; $T_1$ is a filling time required for supplying hydraulic oil to a clutch which shifts the transmission from the arbitrary speed range to the higher speed range; and $\Delta E_1$ is a specified small speed ratio.

In the third form of the invention, when shifting the transmission from an arbitrary speed range into a higher speed range, gear shifting is performed at the time the relative rotation speed ratio of the clutch to be engaged to the disc plate is in close proximity to zero, or at the time the relative rotation speed ratio, which is estimated from the increase $\Delta e$ in the absolute value of the actual speed ratio e and from the filling time for the clutch to be engaged, is in close proximity to zero.

In the third form of the invention, the shift control means is preferably designed to perform gear shifting if the difference ($n_E-N_E$) between an actual engine revolution speed $n_E$ and target engine revolution speed $N_E$ exceeds a preset value $\Delta N_{E1}$.

The shift control means is preferably designed to perform gear shifting if the elapsed time since shifting from the higher speed range to the arbitrary speed range is not less than a preset value $T_4$. This prevents hunting which may occur after speed change.

Further, the shift control means is preferably designed to perform gear shifting if a forward/reverse drive change lever is not operated to shift the transmission between forward, neutral and reverse speed ranges. This prevents time losses which may be caused during gear shifting.

Further, the shift control means is preferably designed to perform gear shifting if the speed ratio $E_0$ is below a maximum speed ratio $E_{max}$.

In the first to third forms of the invention, the shift control means is preferably designed such that, during the shifting from the arbitrary speed range to the higher speed range, the shift control means keeps a clutch for the arbitrary speed range in its engaged state while generating a signal for instructing the engagement of a clutch for the higher speed range, and at the same time, the shift control means increases a target speed ratio E so as to be equal to the speed ratio $E_0$ and generates a signal for instructing the disengagement of the clutch for the arbitrary speed range after elapse of a time $T_1-T_2$ where $0 \leq T_2 < T_1$.

In this case, during the shifting from the arbitrary speed range to the higher speed range, the shift control means preferably stops the generation of a signal for instructing the engagement of the clutch for the higher speed range, if the actual engine revolution speed drops below the target engine revolution speed by more than a preset value during a period of time $T_1-T_2$, or if the forward/reverse drive change lever has been operated for gear shifting.

In the first form of the invention, when the temperature of hydraulic oil is low, that is, it is not higher than operating temperature for the vehicle, the shift control means performs control in the following manner. During the shifting from the arbitrary speed range to the higher speed range, the shift control means keeps a clutch for the arbitrary speed range in its engaged state while generating a signal for instructing the engagement of a clutch for the higher speed range, and generates a signal for instructing the disengagement of the clutch for the arbitrary speed range if a condition, in which the difference between the speed ratios e and $E_0$ is not more than a specified small value, has continued for a predetermined time. This positively prevents torque starvation when the temperature of hydraulic oil is low.

According to the fourth aspect of the invention, there is provided a speed change gear control system for use in a hydrostatic-mechanical transmission which is equipped with a mechanical transmission unit actuated through an input shaft connectable to a power source; a hydrostatic transmission unit which is connectable to the input shaft and comprises a pump and motor having their respective discharge setting swash plates, the angle of at least either of the swash plates being variable; and a differential unit for actuating both the mechanical transmission unit and the hydrostatic transmission unit by connecting an output shaft thereto, the system comprising:

shift control means for performing gear shifting for shifting the transmission from an arbitrary speed range into a lower speed range which provides lower absolute speed than the arbitrary speed range, provided that the actual speed ratio e of the transmission satisfies $|E_1'|>|e|>|E_0'|$, where $E_0'$ is a speed ratio for a shifting point at which the transmission is shifted from the arbitrary speed range into the lower speed range; and $E_1'$ is a speed ratio in proximity to the speed ratio $E_0'$, which is for a point at which the relative revolution speed of a clutch with respect to a disc plate is not more than a specified small value.

In the fourth form of the invention, when shifting the transmission from an arbitrary speed range into a lower speed range, gear shifting is performed at the time the relative revolution speed of the clutch to be engaged with respect to the disc plate is in close proximity to zero. Therefore, gear shifting can be performed without interrupting the deceleration of the vehicle, which reduces the time during which deceleration is interrupted. In addition, a shock due to speed change at the time of gear shifting and a breakage of the clutch can be positively prevented.

According to the fifth aspect of the invention, there is provided a speed change gear control system for use in a hydrostatic-mechanical transmission which is equipped with a mechanical transmission unit actuated through an input shaft connectable to a power source; a hydrostatic transmission unit which is connectable to the input shaft and comprises a pump and motor having their respective discharge setting swash plates, the angle of at least either of the swash plates being variable; and a differential unit for actuating both the mechanical transmission unit and the hydrostatic transmission unit by connecting an output shaft thereto, the system comprising:

shift control means for performing gear shifting for shifting the transmission from an arbitrary speed range into a lower speed range which provides lower absolute speed than the arbitrary speed range, provided that $|e|+(\Delta e/\Delta t) \times T_1' < |E_0'| + \Delta E_1'$, where $\Delta e$ ($\Delta e < 0$) is a decrease in the absolute value of the actual speed ratio e of the transmission over a period of time $\Delta t$; $T_1'$ is a filling time required for supplying hydraulic oil to a clutch which shifts the transmission from the arbitrary speed range to the lower speed range; and $\Delta E_1'$ is a specified small speed ratio.

In the fifth form of the invention, when shifting the transmission from an arbitrary speed range into a lower speed range, a point at which the relative revolution speed of a clutch to be engaged is in close proximity to zero is estimated from an decrease $\Delta e$ in the absolute value of the actual speed ratio e and from the filling time for the clutch to be engaged, and the clutch shift control is performed by changing the speed ratio even during the filling time of hydraulic oil. Therefore, the presently engaged clutch can be disengaged almost simultaneously with the engagement of the next clutch, thereby reducing the deceleration interrupting time. In addition, a shock due to speed change at the time of gear shifting and a breakage of the clutch can be positively prevented.

According to the sixth aspect of the invention, there is provided a speed change gear control system for use in a hydrostatic-mechanical transmission which is equipped with a mechanical transmission unit actuated through an input shaft connectable to a power source; a hydrostatic transmission unit which is connectable to the input shaft and comprises a pump and motor having their respective discharge setting swash plates, the angle of at least either of the swash plates being variable; and a differential unit for actuating both the mechanical transmission unit and the hydrostatic transmission unit by connecting an output shaft thereto, the system comprising:

shift control means for performing gear shifting for shifting the transmission from an arbitrary speed range into a lower speed range which provides lower absolute speed than the arbitrary speed range, provided that the actual speed ratio e of the transmission satisfies $|E_1'| > |e| > |E_0'|$, where $E_0'$ is a speed ratio for a shifting point at which the transmission is shifted from the arbitrary speed range into the lower speed range; and $E_1'$ is a speed ratio in proximity to the speed ratio $E_0'$, which is for a point at which the relative revolution speed of a clutch with respect to a disc plate is not more than a specified small value, or provided that $|e|+(\Delta e/\Delta t) \times T_1' < |E_0'| + \Delta E_1'$, where $\Delta e$ ($\Delta e < 0$) is a decrease in the absolute value of the actual speed ratio e of the transmission over a period of time $\Delta t$; $T_1'$ is a filling time required for supplying hydraulic oil to a clutch which shifts the transmission from the arbitrary speed range to the lower speed range; and $\Delta E_1$ is a specified small speed ratio.

In the sixth form of the invention, when shifting the transmission from an arbitrary speed range to a lower speed range, gear shifting is performed at the time the relative revolution speed of the clutch to be engaged with respect to the disc plate is in close proximate to zero or at the time the relative rotation speed ratio, which is estimated from an decrease $\Delta e$ in the absolute value of the actual speed ratio e and from the filling time for the clutch to be engaged, is in close proximity to zero.

In the sixth form of the invention, the shift control means is preferably designed to perform gear shifting if the difference ($n_E - N_E$) between the actual engine revolution speed $n_E$ and the target engine revolution speed $N_E$ is below a preset value $-\Delta N_{E1}'$.

The shift control means preferably performs gear shifting if the elapsed time since shifting from the lower speed range to the arbitrary speed range is not less than a preset value $T_4'$.

The shift control means preferably performs gear shifting if the brake pedal is pressed down.

The shift control means preferably performs gear shifting if the forward/reverse drive change lever is operated to shift the transmission between forward, neutral and reverse speed ranges.

The shift control means preferably performs gear shifting if a maximum speed ratio $E_{max}$ is below the speed ratio $E_0'$.

In the fourth to sixth forms of the invention, the shift control means is preferably designed such that, during the shifting from the arbitrary speed range to the lower speed range, the shift control means keeps the clutch for the arbitrary speed range in its engaged state while generating a signal for instructing the engagement of the clutch for the lower speed range, and at the same time, the shift control means decreases a target speed ratio E so as to be equal to the speed ratio $E^{0'}$ and generates a signal for instructing the disengagement of the clutch for the arbitrary speed range after elapse of a time $T_1' - T_2'$ where $0 \leq T_2' < T_1'$.

In this case, during the shifting from the arbitrary speed range to the lower speed range, the shift control means preferably stops the generation of a signal for instructing the engagement of the clutch for the lower speed range, if the actual engine revolution speed exceeds the target engine revolution speed by more than a preset value, during a period of time $T_1' - T_2'$, or if the forward/reverse drive change lever has been operated for gear shifting.

In the forth form of the invention, when the temperature of hydraulic oil is low, that is, it is not higher than operating temperature for the vehicle, the shift control means performs control in the following way. During the shifting from the arbitrary speed range to the lower speed range, the shift control means keeps the clutch for the arbitrary speed range in its engaged state while generating a signal for instructing the engagement of a clutch for the lower speed range and generates a signal for instructing the disengagement of the clutch for the arbitrary speed range if a condition, in which the difference between the speed ratios e and $E^{0'}$ is not more than the specified small value, has continued for a predetermined time.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only, and thus are not limitative of the present invention, and wherein:

FIG. 1 is a schematic block diagram showing the whole structure of the speed change gear control system for a hydrostatic-mechanical transmission;

FIG. 2 is a graph showing the relationship between the speed ratio and the motor speed ratio;

FIG. 3 is a circuit diagram of a driving circuit for operating a hydrostatic clutch;

FIG. 4 is a flow chart of gear shift control according to the embodiment of the invention;

FIG. 5 is a diagram showing conditions for starting high gear shift control;,

FIG. 6 is a diagram showing conditions for starting low gear shift control;

FIG. 7 is a timing chart of the gear shift control;

FIG. 8 is a graph showing one example of measurement data of clutch filling time relative to engine revolution speed; and FIG. 9 is a graph of pump capacity and motor capacity verses vehicle speed.

BEST MODE FOR CARRYING OUT THE INVENTION

Reference is now made to the drawings for describing a speed change gear control system for a hydrostatic-mechanical transmission according to an embodiment of the invention.

Figure 1:
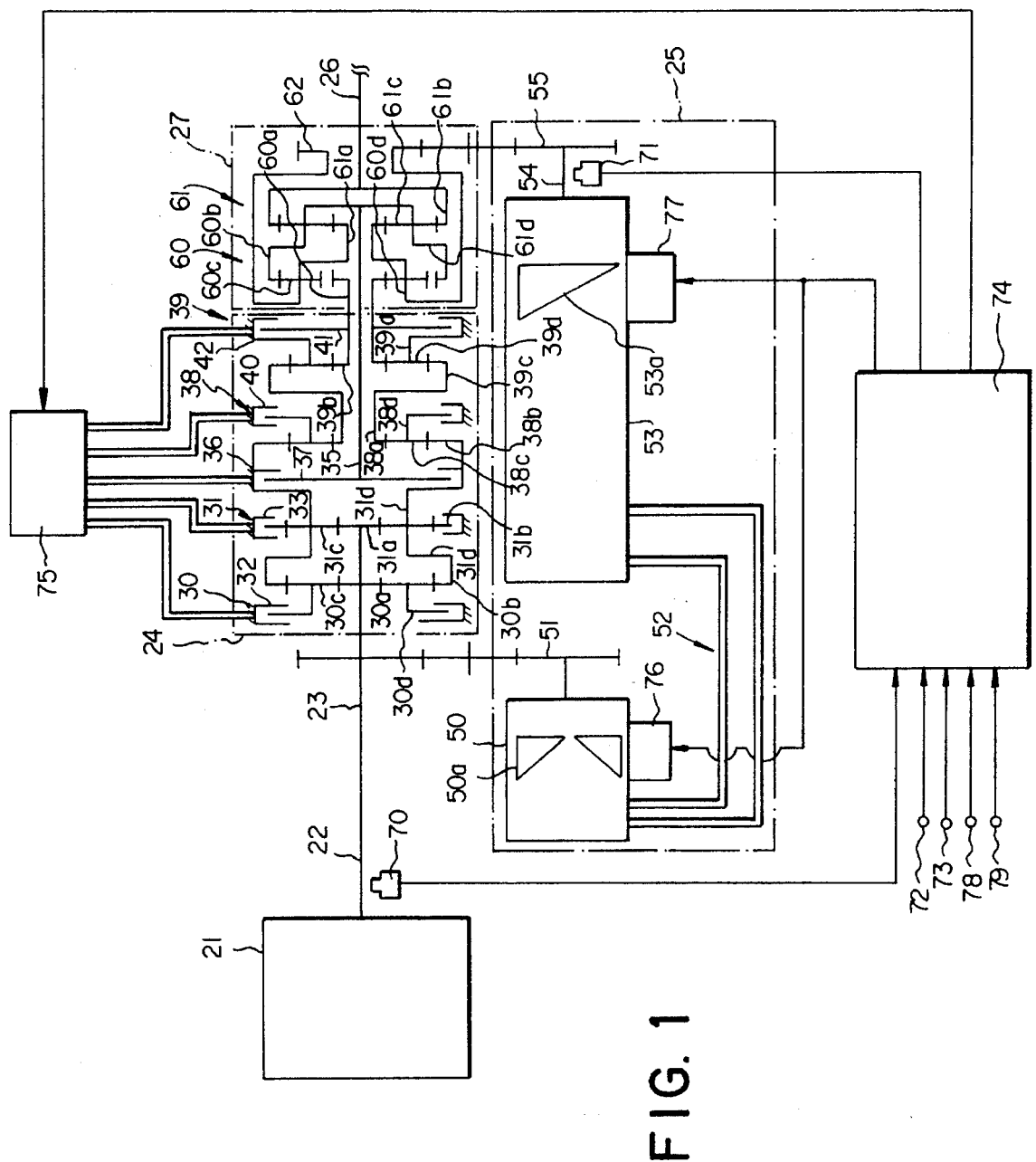
FIGS. 1 to 9 provide illustrations of a speed change gear control system for a hydrostatic-mechanical transmission according to an embodiment of the invention.

In FIG. 1, there are provided a mechanical transmission unit 24 with a transmission for providing three forward speeds and three reverse speeds and a hydrostatic transmission unit 25 having a hydraulic pump and motor. These units 24 and 25 are connected to an input shaft 23 connected coaxially to an output shaft 22 of an engine 21 which is employed as one example of the power source of the system according to the invention, so that power transmitted from the engine 21 is split. There is also provided a differential unit 27 that connects an output shaft 26 selectively to both the mechanical transmission unit 24 and the hydrostatic transmission unit 25, or to the hydrostatic transmission unit 25 only, for driving.

The mechanical transmission unit 24, the hydrostatic transmission unit 25 and the differential unit 27 will be hereinafter described in that order.

(1) Mechanical transmission unit 24

In FIG. 1, the input shaft 23 is provided with a reverse planetary gear train 30 and a forward planetary, gear train 31. The gear trains 30 and 31 are of the single planetary, type and are aligned in an axial direction of the input shaft 23 in this order when enumerating from the left. The reverse planetary gear train 30 is composed of a sun gear 30a fixedly attached to the input shaft 23; a ring gear 30b positioned outside the sun gear 30a; a planet gear 30c which is in mesh with the gears 30a and 30b, being positioned therebetween; and a planet carrier 30d that is for the planet gear 30c and can be hydraulically braked by a reverse hydraulic clutch 32. Similarly, the forward planetary gear train 31 is composed of a sun gear 31a fixedly attached to the input shaft 23; a ring gear 31b which is positioned outside the sun gear 31a and can be hydraulically braked by a forward hydraulic clutch 33; a planet gear 31c which is in mesh with the gears 31a and 31b, being positioned therebetween; and a planet carrier 31d that is for the planet gear 31c and is integral with the ring gear 30b of the reverse planetary, gear train 30.

There is provided an intermediate shaft 35 positioned coaxially with and in an extending direction of the input shaft 23. In FIG. 1, the intermediate shaft 35 is provided, at the left end thereof, with a clutch board 37 that is hydraulically, connectable by a 2nd-speed hydraulic clutch 36. The 2nd-speed hydraulic clutch 36 is formed integrally with the planet carrier 31d of the forward planetary gear train 31. The intermediate shaft 35 is also provided with a 3rd-speed planetary gear train 38 and a 3rd-speed planetary gear train 39. The gear trains 38 and 39 are of the single planetary type and are aligned in an axial direction of the intermediate shaft 35 in this order when enumerating from the left in FIG. 1.

The 3rd-speed planetary gear train 38 is composed of a sun gear 38a rotatably supported by the intermediate shaft 35; a ring gear 38b which is positioned outside the sun gear 38a, being integral with the planet carrier 31d of the forward planetary gear train 31 and the 2nd-speed hydraulic clutch 36; a planet gear 38c which is in mesh with the gears 38a and 38b, being positioned therebetween; and a planet carrier 38d that is for the planet gear 38c and can be hydraulically braked by a 3rd-speed hydraulic clutch 40. Similarly, the 3rd-speed planetary gear train 39 is composed of a sun gear 39b which is rotatably supported by the intermediate shaft 35, a ring gear 39c which is positioned outside the sun gear 39b, being integral with the sun gear 38a of the 3rd-speed planetary gear train 38; a planet gear 39d which is in mesh with the gears 39b and 39c, being positioned therebetween; and a fixed planet carrier 39e that is for the planet gear 39d.

(2) Hydrostatic transmission unit 25

The input shaft 23 is coupled through a gear train 51 to a variable displacement pump 50 having a displacement setting variable-angle swash plate 50a which swings both in the positive and negative directions. The variable displacement pump 50 is connected, through a pair of conduits 52 consisting of an outgoing path and a return path, to a variable displacement motor 53 having a displacement setting variable-angle swash plate 53a which swings in one direction. An output shaft 54 of the variable displacement motor 53 is connected to a gear train 55. The displacement setting variable-angle swash plates 50a and 53a provided in the variable displacement pump 50 and the variable displacement motor 53 are arranged such that the revolution speed of the variable displacement pump 50 and that of the variable displacement motor 53 vary according to variations in the angles of the displacement setting variable-angle swash plates 50a and 53a, as described below.

The revolution speed of the variable displacement pump 50 is specified, and the displacement setting variable-angle swash plate 53a of the variable displacement motor 53 is inclined at a maximum tilt angle. In the above condition, as the tilt angle of the displacement setting variable-angle swash plate 50a of the variable displacement pump 50 is inclined from zero in the positive direction, the revolution speed of the variable displacement motor 53 increases from zero in the positive direction. Then, the tilt angle of the displacement setting variable-angle swash plate 50a of the variable displacement pump 50 is set to a maximum positive value. In this condition, as the tilt angle of the displacement setting variable-angle swash plate 53a of the variable displacement motor 53 is decreased, the revolution speed of the variable displacement motor 53 further increases in the positive direction.

On the other hand, as the tilt angle of the displacement setting variable-angle swash plate 50a of the variable displacement pump 50 is inclined from zero in the negative direction in condition that the displacement setting variable-angle swash plate 53a of the variable displacement motor 53 is inclined at a maximum tilt angle, the revolution speed of the variable displacement motor 53 increases from zero in the negative direction. Then, the tilt angle of the displacement setting variable-angle swash plate 50a of the variable displacement pump 50 is set to a maximum negative value. In this condition, as the tilt angle of the displacement setting variable-angle swash plate 53a of the variable displacement motor 53 is decreased, the revolution speed of the variable displacement motor 53 further increases in the negative direction.

(3) Differential unit 27

In FIG. 1, the intermediate shaft 35 is provided, at the right end, with a first differential planetary gear train 60 of the double planetary, type and a second differential planetary, gear train 61 of the single planetary type. These gear trains 60 and 61 are aligned coaxially with and in an extending direction of the intermediate shaft 35 in this order when enumerating from the left. The first differential planetary, gear train 60 is composed of a sun gear 60a which is rotatably supported by the intermediate shaft 35, being integral with the sun gear 39b of the 3rd-speed planetary, gear train 39 and a clutch board 41; a ring gear 60b positioned outside the sun gear 60a; a planet gear 60c which is in mesh with the gears 60a and 60b, being positioned therebetween; and a planet carrier 60d that is for the planet gear 60c and is integral with an input gear 62 connected through the gear train 55 to the output shaft 54 of the variable displacement motor 53 in the hydrostatic transmission unit 25. Similarly, the second differential planetary gear train 61 is composed of a sun gear 61a which is rotatably supported by the intermediate shaft 35, being integral with the planet carrier 60d of the first differential planetary, gear train 60; a ring gear 61b which is positioned outside the sun gear 61a, being integral with the output shaft 26 positioned (at the right hand in FIG. 1) coaxially with and in an extending direction of the intermediate shaft 35; a planet gear 61c which is in mesh with the gears 61a and 61b, being positioned therebetween; and a planet carrier 61d that is for the planet gear 61c and is integral with the ring gear 60b of the first differential planetary gear train 60 and the intermediate shaft 35.

Figure 2:
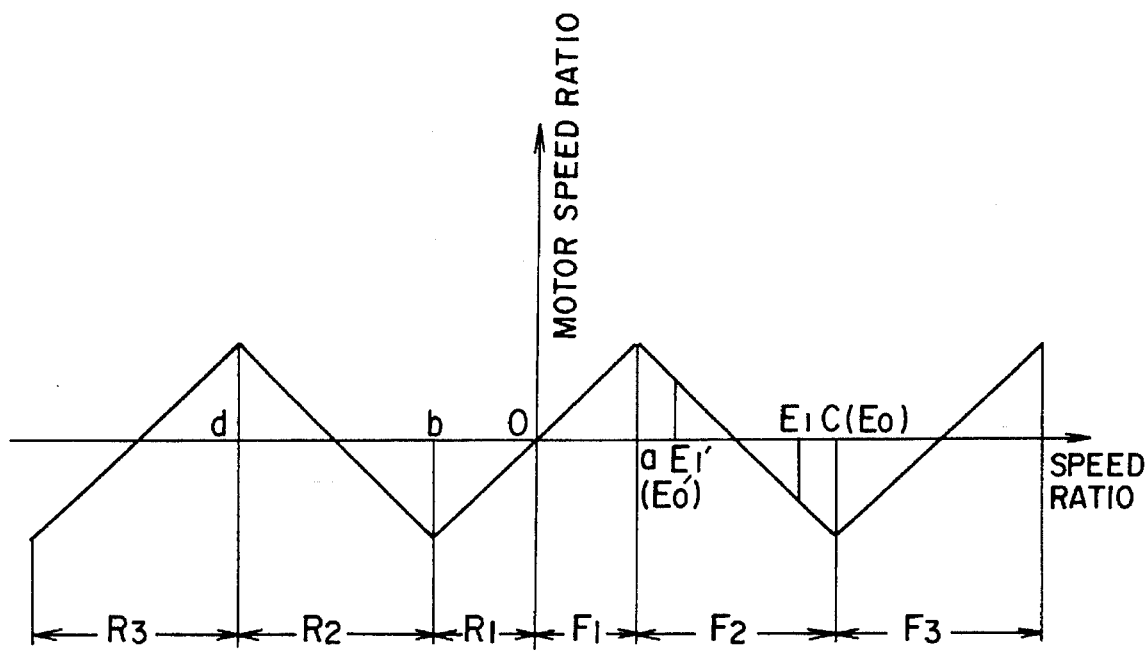

There will be given an explanation on the mechanical operations of the mechanical transmission unit 24, the hydrostatic transmission unit 25 and the differential unit 27. FIG. 2 shows the relationship between revolution speed ratio (i.e., the ratio of the revolution speed of the output shaft 26 to the revolution speed of the output shaft 22 of the engine 21 (=the revolution speed of the engine)) and motor speed ratio (i.e., the ratio of the revolution speed of the output shaft 54 of the variable displacement motor 53 (=the revolution speed of the motor) to the revolution speed of the output shaft 22 of the engine 21 (=the revolution speed of the engine)) in the respective speed ranges (i.e., 1st forward speed (F1); 2nd forward speed (F23; 3rd forward speed (F33; 1st reverse speed (R1); 2nd reverse speed (R23; and 3rd reverse speed (R3).

(i) 1st forward speed (F1) and 1st reverse speed (R1):

Only the 1st-speed hydraulic clutch 42 is engaged. The engagement of the clutch 42 causes the sun gear 60a of the first differential planetary, gear train 60 to be hydraulically braked through the clutch board 41 and the intermediate shaft 35 to be in a freely rotated state. Accordingly, only the torque of the variable displacement hydraulic motor 53 in the hydrostatic transmission unit 25 is transmitted to the output shaft 54 of the variable displacement hydraulic motor 53; the gear train 55; the input gear 62, the planet carrier 60d, the planet gear 60c and the ring gear 60b of the first differential planetary, gear train 60, the planet carrier 61d, the planet gear 61c and the ring gear 61b of the second differential gear train 61 in the differential unit 27; and the output shaft 26 in that order. In short, the output shaft 26 is driven, being connected only to the hydrostatic transmission unit 25 by means of the differential unit 27.

As the motor speed ratio is thus increased from zero in the positive direction, the revolution speed of the output shaft 26 increases from zero in the positive direction. On the other hand, as the motor speed ratio decreases from zero in the negative direction, the revolution speed of the output shaft 26 also increases from zero in the negative direction. Thus, the revolution speed ratio is infinitely varied both in the positive and negative directions within a specified range.

In 1st forward speed (F1) and 1st reverse speed (R1), the 2nd-speed hydraulic clutch 36 may be engaged or not. However, when taking into account the case that the speed may be shifted to 2nd forward speed (F2) or 2nd reverse speed (R2) by changing the clutch, it is preferable that the 2nd-speed hydraulic clutch 36 is engaged.

In 1st speed, when the revolution speed of the output shaft 26 increases in the positive direction and the revolution speed ratio is a specified positive value a, the relative revolution speed of the forward hydraulic clutch 33 in relation to the ring gear 31b of the forward planetary gear train 31 becomes zero. In this condition, if the forward hydraulic clutch 33 is engaged and the 1st-speed hydraulic clutch 42 is disengaged, 2nd forward speed (F2) will be obtained. At that time, the 2nd-speed hydraulic clutch 36 has been engaged.

In 1st speed, when the revolution speed of the output shaft 26 increases in the negative direction and the revolution speed ratio is a specified negative value b, the relative revolution speed of the reverse hydraulic clutch 32 in relation to the planet gear 30c of the reverse planetary gear train 30 becomes zero. In this condition, if the reverse hydraulic clutch 32 is engaged and the 1st-speed hydraulic clutch 42 is disengaged like the above case, 2nd reverse speed (R2) will be obtained. At that time, the 2nd-speed hydraulic clutch 36 has been engaged.

(ii) 2nd forward speed (F2)

Since the clutch board 37 is hydraulically, connected by the engagement of the 2nd-speed hydraulic clutch 36 and the ring gear 31b of the forward planetary gear train 31 is hydraulically braked by the engagement of the forward hydraulic clutch 33, the torque of the input shaft 23 is transmitted to the forward planetary gear train 31, the 2nd-speed hydraulic clutch 36 and the intermediate shaft 35 in the mechanical transmission unit 24, and then to the second differential planetary gear train 61 in the differential unit 27. As the torque is transmitted, the revolution speed of the input shaft 23 decreases. The torque of the variable displacement motor 53 in the hydrostatic transmission unit 25 is also transmitted to the output shaft 54 of the variable displacement motor 53, the gear train 55, the input gear 62, the planet carrier 60d of the first differential planetary gear train 60 and then to the second differential planetary gear train 61 in the differential unit 27, while the revolution speed is being reduced. The second differential planetary gear train 61 connects the mechanical transmission unit 24 and the hydrostatic transmission unit 25, whereby their revolution speeds are combined to drive the output shaft 26.

Thus, the motor speed ratio decreases thereby increasing the revolution speed of the output shaft 26 in the positive direction.

When the motor speed ratio is positive in 2nd forward speed (F2), part of torque from the second differential planetary gear train 61 in the differential unit 27 flows backwardly to the input gear 62 through the planet gear 61c, the sun gear 61a of the second differential planetary gear train 61 and the first differential planetary gear train 60 so that the variable displacement motor 53 preforms its pumping operation. The pumping operation of the variable displacement motor 53 causes the variable displacement pump 50 to be driven, and the torque of the variable displacement pump 50 is transmitted through the gear train 51 to the input shaft 23 where the torque is combined with the torque of the engine 21.

When the motor speed ratio is negative on the other hand, part of the torque of the input shaft 23 drives the variable displacement pump 50 through the gear train 51. The drive of the variable displacement pump 50 actuates the variable displacement motor 53 whose torque is transmitted to the gear train 55, the input gear 62 etc. in the differential unit 27, and then to the second differential planetary gear train 61 in the differential unit 27. At the second differential planetary gear train 61, the transmitted torque is combined with torque from the mechanical transmission unit 24 to drive the output shaft 26.

In 2nd forward speed (F2), when the revolution speed ratio is increased to a specific value c, the relative revolution speed of the 3rd-speed hydraulic clutch 40 in relation to the planet carrier 38d of the 3rd-speed planetary gear train 38 becomes zero. In this condition, if the 3rd-speed hydraulic clutch 40 is engaged and the 2nd-speed hydraulic clutch 36 is disengaged, 3rd forward speed (F3) will be obtained.

In 2nd forward speed (F2), when the revolution speed ratio decreases from a higher value to the specified value a, the relative revolution speed of the 1st-speed hydraulic clutch 42 in relation to the clutch board 41 becomes zero. In this condition, if the 1st-speed hydraulic clutch 42 is engaged and the forward hydraulic clutch 33 is disengaged, 1st forward speed (F1) will be obtained.

(iii) 3rd forward speed (F3)

Since the planet carrier 38d of the 3rd-speed planetary gear train 38 is hydraulically braked by the engagement of the 3rd-speed hydraulic clutch 40 and the ring gear 31b of the forward planetary gear train 31 is hydraulically braked by the engagement of the forward hydraulic clutch 33, the torque of the input shaft 23 is transmitted through the forward planetary gear train 31, the 2nd-speed speed hydraulic clutch 36, the 3rd-speed planetary gear train 38 and the 3rd-speed planetary gear train 39 in the mechanical transmission unit 24 to the first and second differential planetary gear trains 60 and 61 in the differential unit 27, while the revolution speed is being reduced. The torque of the variable displacement motor 53 in the hydrostatic transmission unit 25 is transmitted through the output shaft 54 of the variable displacement motor 53 and the gear train 55 to the first and second differential planetary gear trains 60 and 61 in the differential unit 27, while the revolution speed is being reduced. The first and second differential planetary gear trains 60 and 61 connect the mechanical transmission unit 24 and the hydrostatic transmission unit 25, whereby their revolution speeds are combined to drive the output shaft 26.

As the motor speed ratio is thus increased, the revolution speed of the output shaft 26 increases in the positive direction.

When the motor speed ratio is negative in 3rd forward speed (F3), part of torque from the first and second differential planetary gear trains 60 and 61 in the differential unit 27 flows backwardly to the input gear 62 so that the variable displacement motor 53 performs its pumping operation and the torque of the variable displacement motor 53 is transmitted, as described above, through the variable displacement pump 50 and the gear train 51 to the input shaft 23 where the torque is combined with the torque of the engine 21.

When the motor speed ratio is positive on the other hand, part of the torque of the input shaft 23 drives the variable displacement pump 50 through the gear train 51, and the torque of the variable displacement motor 53 is transmitted, as described above, through the gear train 55 and the input gear 62 etc. in the differential unit 27 to the first and second differential planetary gear trains 60 and 61 in the differential unit 27. At the first and second differential planetary gear trains 60 and 61, the torque is combined with torque from the mechanical transmission unit 24 to drive the output shaft 26.

In 3rd forward speed (F3), when the revolution speed ratio decreases from a higher value to the specified value c, the relative revolution speed of the 2nd-speed hydraulic clutch 36 in relation to the clutch board 37 becomes zero. In this condition, if the 2nd-speed hydraulic clutch 36 is engaged and the 3rd-speed hydraulic clutch 40 is disengaged, 2nd forward speed (F2) will be obtained.

(iv) 2nd reverse speed (R2)

Since the clutch board 37 is hydraulically connected by the engagement of the 2nd-speed hydraulic clutch 36 and the planet carrier 30d of the reverse planetary gear train 30 is hydraulically braked by the engagement of the reverse hydraulic clutch 32, the torque of the input shaft 23 is transmitted through the reverse planetary gear train 30, the 2nd-speed hydraulic clutch 36 and the intermediate shaft 35 in the mechanical transmission unit 24 to the second differential planetary gear train 61 in the differential unit 27, while the revolution speed is being reduced. The torque of the variable displacement motor 53 in the hydrostatic transmission unit 25 is transmitted, as described above, through the output shaft 54 of the variable displacement motor 53, the gear train 55, the input gear 62 and the planet carrier 60d of the first differential planetary gear train 60 in the differential unit 27 to the second differential planetary gear train 61, while the revolution speed is being reduced. The first differential planetary gear train 61 connects the mechanical transmission unit 24 and the hydrostatic transmission unit 25 thereby combining their revolution speeds to drive the output shaft 26.

As the motor speed ratio is increased accordingly, the revolution speed of the output shaft 26 increases in the negative direction.

In 2nd reverse speed (R2), when the motor speed ratio is negative, part of torque from the second differential planetary gear train 61 in the differential unit 27 flows backwardly to the hydrostatic transmission unit 25 so that the variable displacement motor 53 performs its pumping operation. When the motor speed ratio is positive, the operation to be carried out is the same as that described in the case of 2nd forward speed (F2), except that the partial flow of the torque of the input shaft 23 toward the hydrostatic transmission unit 25 occurs.

In 2nd reverse speed (R2), when the revolution speed ratio decreases from a higher value to a specified value d, the relative revolution speed of the 3rd-speed hydraulic clutch 40 in relation to the planet carrier 38d of the 3rd-speed planetary gear train 38 becomes zero. In this condition, if the 3rd-speed hydraulic clutch 40 is engaged and the 2nd-speed hydraulic clutch 36 is disengaged, 3rd reverse speed (R3) will be obtained.

When the revolution speed ratio is increased to the specified value h in 2nd reverse speed (R2), the relative revolution speed of the 1st-speed hydraulic clutch 42 in relation to the clutch board 41 becomes zero. In this condition, if the 1st-speed hydraulic clutch 42 is engaged and the reverse hydraulic clutch 32 is disengaged, 1st reverse speed (R1) will be obtained.

(v) 3rd reverse speed (R3)

Since the planet carrier 38d of the 3rd-speed planetary gear train 38 is hydraulically braked by the engagement of the 3rd-speed hydraulic clutch 40 and the planet carrier 30d of the reverse planetary gear train 30 is hydraulically braked by the engagement of the reverse hydraulic clutch 32, the torque of the input shaft 23 is transmitted through the reverse planetary gear train 30, the 2nd-speed hydraulic clutch 36, the 3rd-speed planetary gear train 38 and the 3rd-speed planetary, gear train 39 in the mechanical transmission unit 24 to the first and second differential planetary gear trains 60 and 61 in the differential unit 27, while the revolution speed is being reduced. Also, the torque of the variable displacement motor 53 in the hydrostatic transmission unit 25 is transmitted, as described above, through the output shaft 54 of the variable displacement motor 53 and the gear train 55 to the first and second differential planetary, gear trains 60 and 61 in the differential unit 27, while the revolution speed is being reduced. The first and second differential planetary gear trains 60 and 61 connect the mechanical transmission unit 24 and the hydrostatic transmission unit 25 thereby combining their revolution speeds to drive the output shaft 26.

As the motor speed ratio is decreased accordingly, the revolution speed of the output shaft 26 increases in the negative direction.

In 3rd reverse speed (R3), when the motor speed ratio is positive, part of torque from the first and second differential planetary gear trains 60 and 61 in the differential unit 27 flows backwardly to the hydrostatic transmission unit 25 so that the variable displacement motor 53 performs its pumping operation. When the motor speed ratio is negative, the operation to be carried out is the same as that described in the case of 3rd forward speed (F3), except that the partial flow of the torque of the input shaft 23 toward the hydrostatic transmission unit 25 occurs.

In 3rd reverse speed (R3), when the revolution speed ratio is increased to the specified value d, the relative revolution speed of the 2nd-speed hydraulic clutch 36 in relation to the clutch board 37 becomes zero. In this condition, if the 2nd-speed hydraulic clutch 36 is engaged and the 3rd-speed hydraulic clutch 40 is disengaged, 2nd reverse speed (R2) will be obtained.

The control operation for the mechanical transmission unit 24 and the hydrostatic transmission unit 25 will be explained hereinbelow.

In FIG. 1, the output shaft 22 of the engine 21 is provided with an engine revolution speed detector 70 for detecting the revolution speed of the output shaft 22 to detect the engine revolution speed $n_E$ of the engine 21, and the output shaft 54 of the variable displacement motor 53 in the hydrostatic transmission unit 25 is provided with a motor revolution speed detector 71 for detecting the revolution speed $n_m$ of the variable displacement motor 53 as well as the direction of the revolution. An engine throttle (not shown) is provided with a throttle position detector 72 for detecting the throttle position x of the engine throttle to be manipulated. A change lever (not shown) is provided with a lever position detector 73 for detecting the lever position FNR (i.e., forward, neutral or reverse position) of the change lever to be manipulated, a brake pedal (not shown) is provided with a brake pressing-down amount detector 78 for detecting the pressing-down amount of the brake, and a speed ratio lever (not shown) is provided with a maximum speed ratio detector 79 for detecting an upper limit for the speed ratio during control $E_{max}$. The engine revolution speed detector 70, the motor revolution speed detector 71, the throttle position detector 72, the lever position detector 73, the brake pressing-down amount detector 78 and the maximum speed ratio detector 79 issue an engine revolution speed signal, a motor revolution speed signal, a throttle position signal, a lever position signal, a brake amount signal and a speed ratio upper limit signal, respectively, to a controller section 74. The controller section 74 executes signal processing in accordance with those signals and issues a shift control signal to a shift valve 75 so that the engagements/disengagements of the reverse hydraulic clutch 32, the forward hydraulic clutch 33, the 2nd-speed hydraulic clutch 36, the 3rd-speed hydraulic clutch 40 and the 1st-speed hydraulic clutch 42 are carried out as described above. The controller section 74 also supplies an angle control signal to a change-angel valve 76 for the displacement setting variable-angle swash board 50a of the variable displacement pump 50 and to a change-angle valve 77 for the displacement setting variable-angle swash board 53a of the variable displacement motor 53, respectively.

A target engine revolution speed $N_E$ for the engine 21 according to the position x of the engine throttle operated is obtained, and the control direction of the revolution speed ratio according to the lever position FNR of the change lever operated is determined. Thus, the control of the revolution speed ratio is performed in the controller section 74 as shown in Table 1. This control operation is based on the condition (positive or negative etc.) of the actual speed ratio e; the relationship between the actual engine revolution speed $n_E$ that is obtained from the engine revolution speed signal from the engine revolution speed detector 70 and the target engine revolution speed $N_E$ that is obtained from the throttle position signal from the throttle position detector 72; and the lever position FNR obtained from the lever position signal from the lever position detector 73.

TABLE 1

| actual revolution speed ratio e | relation between target engine revolution speed $N_E$ and actual engine revolution speed $n_E$ | lever position FNR | control of revolution speed ratio |
|---|---|---|---|
| $\geq 0$ | $n_E > N_E$ | forward | increase toward positive |
| $>0$ | $n_E < N_E$ | | decrease toward zero |
| $=0$ | $n_E < N_E$ | | keep at zero |
| $\geq 0$ | $n_E = N_E$ | | keep constant |
| $<0$ | $n_E \gtreqless N_E$ (all conditions) | | increase toward zero |
| $>0$ | $n_E \gtreqless N_E$ (all conditions) | neutral | decrease toward zero |
| $=0$ | $n_E \gtreqless N_E$ all conditions) | | keep at zero |
| $<0$ | $n_E \gtreqless N_E$ (all conditions) | | increase toward zero |
| $\leq 0$ | $n_E > N_E$ | reverse | decrease toward negative |
| $<0$ | $n_E < N_E$ | | increase toward zero |
| $=0$ | $n_E < N_E$ | | keep at zero |
| $\leq 0$ | $n_E = N_E$ | | keep constant |
| $>0$ | $n_E \gtreqless N_E$ (all conditions) | | decrease toward zero |

Next, control of the engine revolution speed through controlling the speed ratio will be explained.

In accordance with the throttle position signal from the throttle position detector 72, the target engine revolution speed $N_E$ of the engine 21 for the throttle position x is firstly obtained from calculation that includes conversion and is executed by the use of a preliminarily set and stored characteristic functional equation or table. The characteristic functional equation or table is set based on the characteristic curve of the target engine revolution speed $N_E$ for the throttle position x, the characteristic curve having been prepared from the characteristic curve of the torque for the engine revolution speed of the engine 21. Next, the actual motor speed ratio $e_m$ ($=n_m/n_E$), which is the ratio of the actual motor revolution speed $n_m$ to the actual engine revolution speed $n_E$, is calculated from the actual engine revolution speed $n_E$ which has been obtained from the engine revolution speed signal from the engine revolution speed detector 70 and the actual motor revolution speed $n_m$ which has been detected by the motor revolution speed detector 71. Then, the actual motor speed ratio $e_m$ thus obtained is converted using the preset and stored characteristic functional equation $e=f(e_m)$ or table in accordance with the control state (speed range) of the mechanical transmission unit 24 controlled by the controller 74 through the shift valve 75, whereby the actual revolution speed ratio e is obtained. This characteristic functional equation $e=f(e_m)$ or table is represented by a characteristic curve similar to that of FIG. 2, and is set in accordance with the characteristic curve of the actual motor speed ratio $E_m$ for the actual revolution speed ratio e.

The target revolution speed ratio E is obtained from the target engine revolution speed $N_E$ and the actual revolution speed ratio e which have been obtained through the above procedure; and the actual engine revolution speed $n_E$, using the following equation.

$$E=e+k(n_E-N_E) \quad (1)$$

where k is a coefficient the unit of which is 1/rpm.

Then, the target revolution speed ratio E thus obtained is converted, like the above case, using the preset and stored characteristic functional equation $E_m=f(E)$ or table in accordance with the control state (speed range) of the mechanical transmission unit 24, whereby the target motor speed ratio $E_m$ is obtained. The characteristic functional equation $E=f(E_m)$ or table is also represented by a characteristic curve similar to that of FIG. 2 and is set in accordance with the characteristic curve of the target motor speed ratio $E_m$ for the target revolution speed ratio E. From the target motor speed ratio $E_m$ thus obtained and the actual motor speed ratio $e_m$, an operating amount A is obtained, the operating amount A being the sum of the feed forward amount $KE_m$ (K:feed forward coefficient) proportional to the target motor speed ratio $E_m$ and the proportional elements and integral elements of the deviation ($=E_m-e_m$) of the actual motor speed ratio $e_m$ with respect to the target motor speed ratio $E_m$. The operating amount A is supplied, in the form of an angle control signal, to the change-angle valves 76 and 77.

Thus, the actual motor speed ratio $e_m$ is controlled by the target motor speed ratio $E_m$, and the actual revolution speed ratio e is controlled by the target revolution speed ratio E so that the actual engine revolution speed $n_E$ is made coincident with the target engine revolution speed $N_E$ for the throttle position x of the engine throttle.

Although the target engine revolution speed $N_E$ is determined by the throttle position x for the sake of simplicity in the foregoing description, the determination only by the throttle position x gives rise to undesirable situations. For example, in cases where the vehicle is accelerated by the operation of the throttle lever, the value of the target engine revolution speed $N_E$ is immediately calculated according to the lever operation, while the actual engine revolution speed $n_E$ does not change immediately in response to the lever operation owing to the effect of the inertia of the engine etc., so that vehicle speed once decreases with the value $(n_e-N_E)$ being negative and the vehicle is accelerated after the actual engine revolution speed $n_e$ has increased by more than the target engine revolution speed $N_E$. On the other hand, in cases where the vehicle is decelerated, the vehicle is once accelerated and deceleration is carried out after the actual engine revolution speed $n_E$ has dropped below the target engine revolution speed $N_E$. In order to avoid such undesirable situations, the target engine revolution speed $N_E$ should desirably not be decided only by the throttle position x but by the history of the target engine revolution speed $N_E$ and the throttle position x. In this case, an upper limit should be placed for the ratio of the increase and decrease of the target engine revolution speed $N_E$.

When the operator presses the brake pedal down, the target engine revolution speed $N_E$ is preferably stepped up with the engine in its braked condition, in order to increase the braking force.

Although the target speed ratio E is determined by the equation $E=e+k(n_E-N_E)$ in this embodiment, it is more preferable that the target speed ratio E is appropriately set in accordance with lever operation by the operator. For example, in cases where a change lever is operated, the target speed ratio g is stepped down to zero. In cases where the speed ratio lever is operated, the maximum speed ratio is varied while being modulated and set as the target speed ratio E when the absolute value of the maximum speed ratio is smaller than the absolute value of $E=e+k(n_E-N_E)$. With such arrangements, forward/reverse drive control, vehicle stop control and other control processes can be performed with high accuracy.

Figure 3:
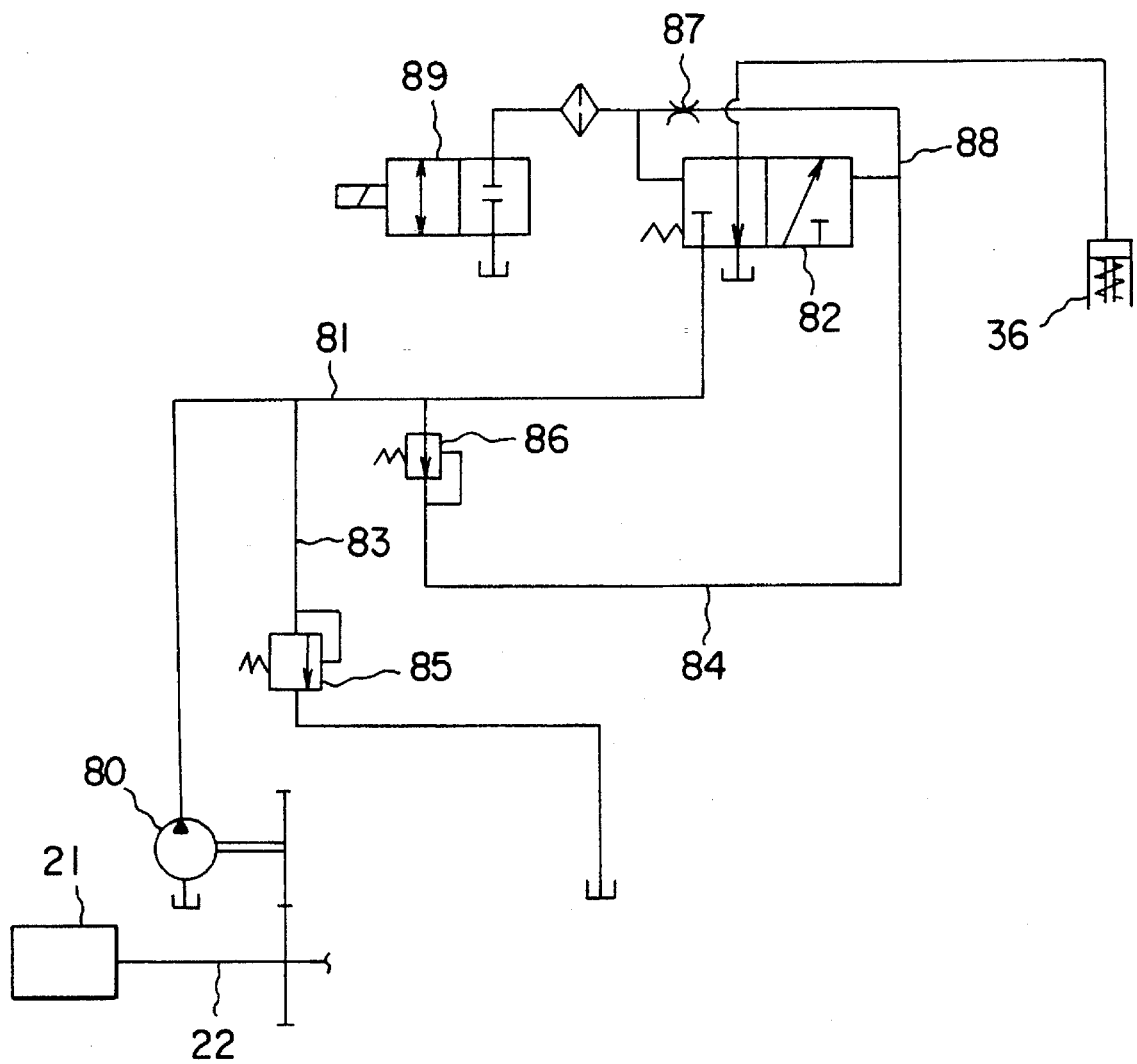

FIG. 3 shows a clutch driving circuit for the 2nd-speed hydraulic clutch 36. Although only the driving circuit for the 2nd-speed hydraulic clutch 36 is illustrated in FIG. 3, the driving circuits for the reverse hydraulic clutch 32, forward hydraulic clutch 33, 3rd-speed hydraulic clutch 40 and 1st-speed hydraulic clutch 42 have the same structure.

This clutch driving circuit is equipped with a hydraulic pump 80 driven by driving force transmitted from the engine 21, and oil discharged from the hydraulic pump 80 is supplied to the operation chamber of the 2nd-speed hydraulic clutch 36 through a conduit 81. A filter (not shown) and a two-position selector valve 82 are inserted in the middle of the conduit 81. A first branch conduit 83 and a second branch conduit 84 are respectively connected at the upstream of the two-position selector valve 82. A relief valve 85 is inserted into the first branch conduit 83 to adjust the pressure applied to the clutch to a predetermined value. The second branch conduit 84 supplies hydraulic oil pressure to the two-position selector valve 82 through a pressure reducing valve 86. Connected to the second branch conduit 84 are a by-pass conduit 88 having a restrictor 87 and a solenoid valve 89.

In shifting clutches, when the solenoid valve 89 is magnetized to move to the right in FIG. 3, oil from the hydraulic pump 80 flows to the conduit 81, second branch conduit 84, by-pass conduit 88 and solenoid valve 89. The oil pressure at the upstream of the restrictor 87 in the by-pass conduit 88 becomes high so that the two-position selector valve 82 moves to the left in FIG. 3, against a spring force. This movement allows the oil which has been supplied through the conduit 81 to flow into the operation chamber of the 2nd-speed hydraulic clutch 36 after passing through the two-position selector valve 82, so that the 2nd-speed hydraulic clutch 36 is operated. If the solenoid valve 89 is demagnetized when the 2nd-speed hydraulic clutch 36 is in its operating state, the solenoid valve 89 returns to the position shown in FIG. 3, so that the pressures at the upstream and downstream of the restrictor 87 become equal to each other and the two-position selector valve 82 returns to its home position (a position as shown in FIG. 3) with the help of a spring force. In consequence, the supply of oil pressure to the operation chamber of the 2nd-speed hydraulic clutch 36 is stopped.

Figure 4A:
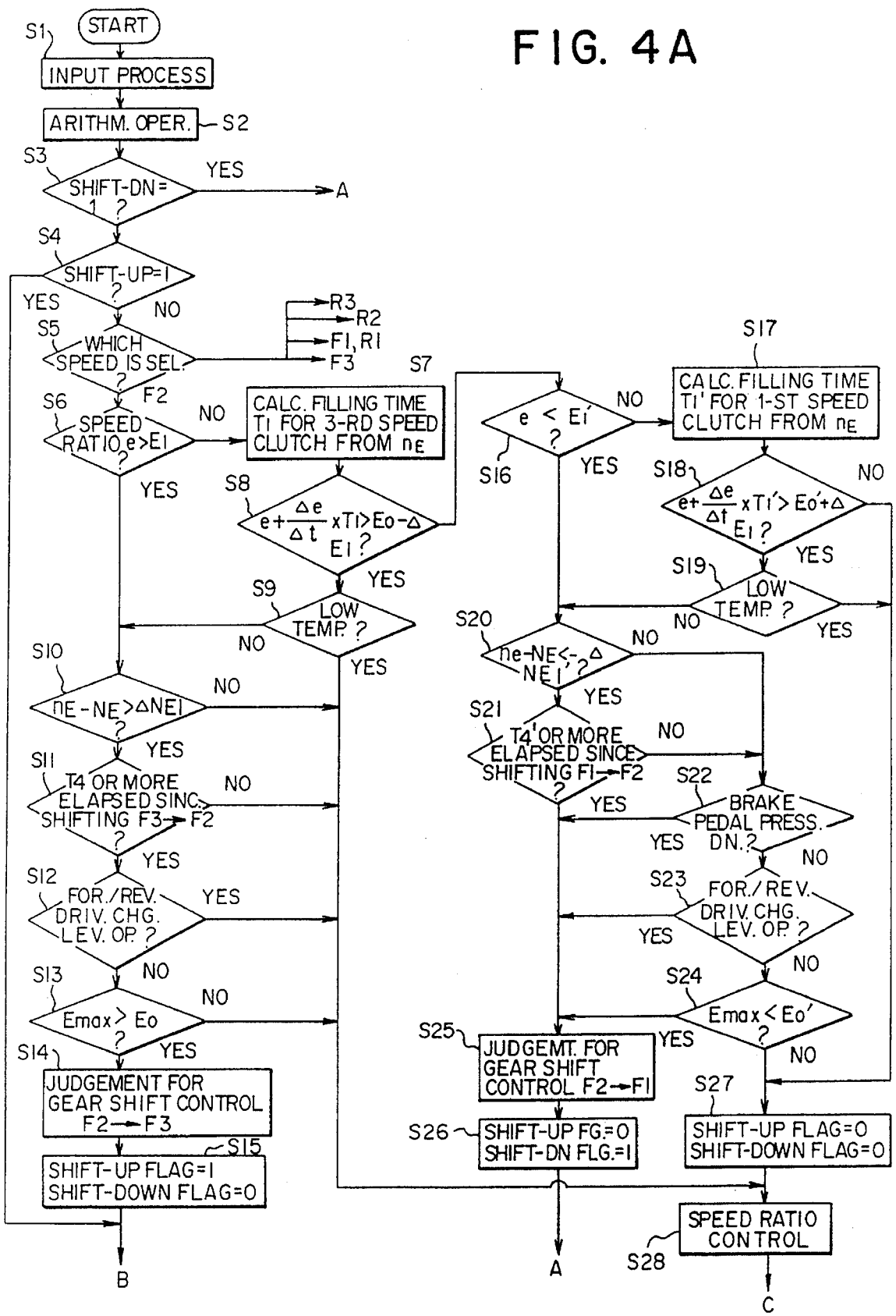
Figure 4B:
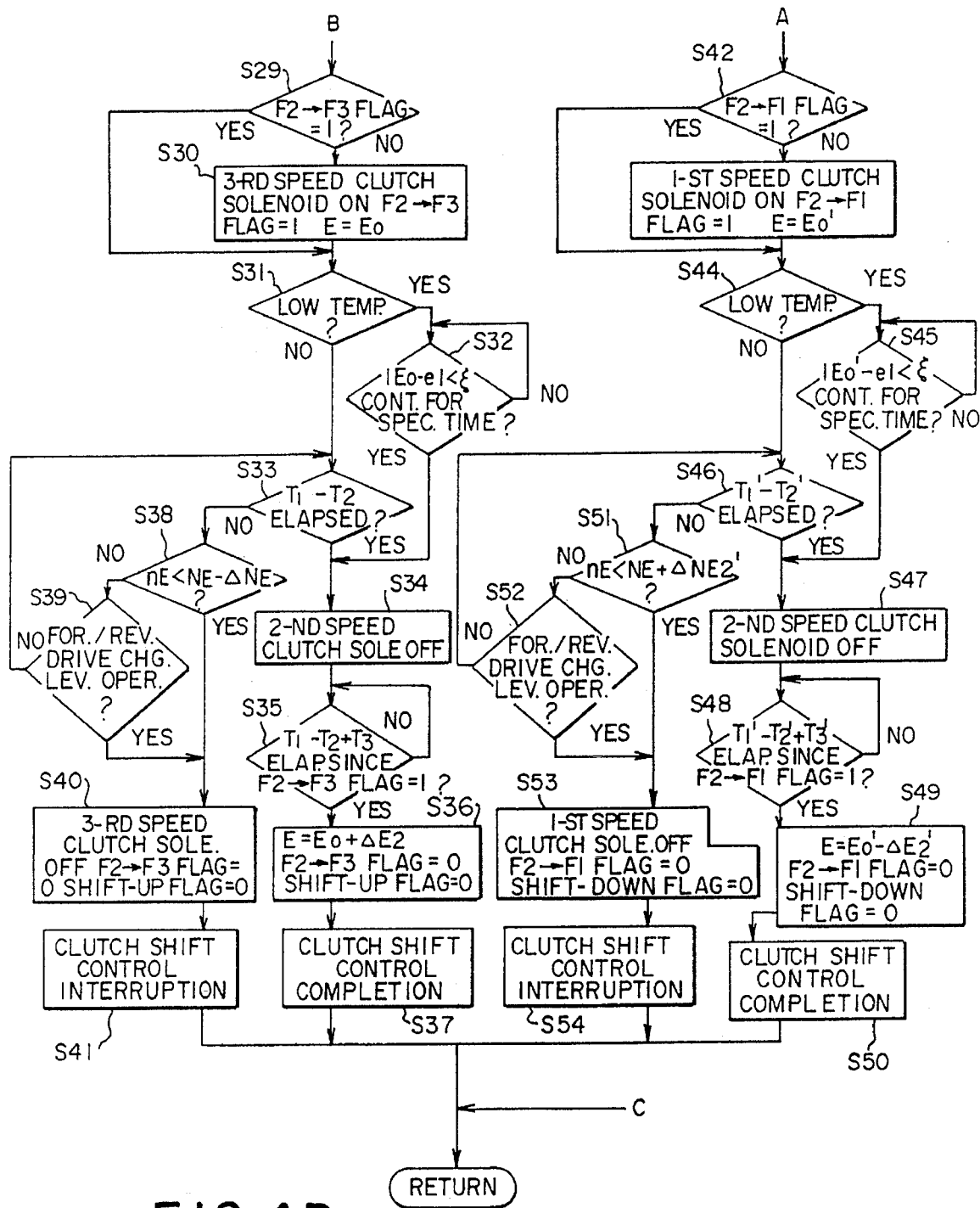
Figure 5:
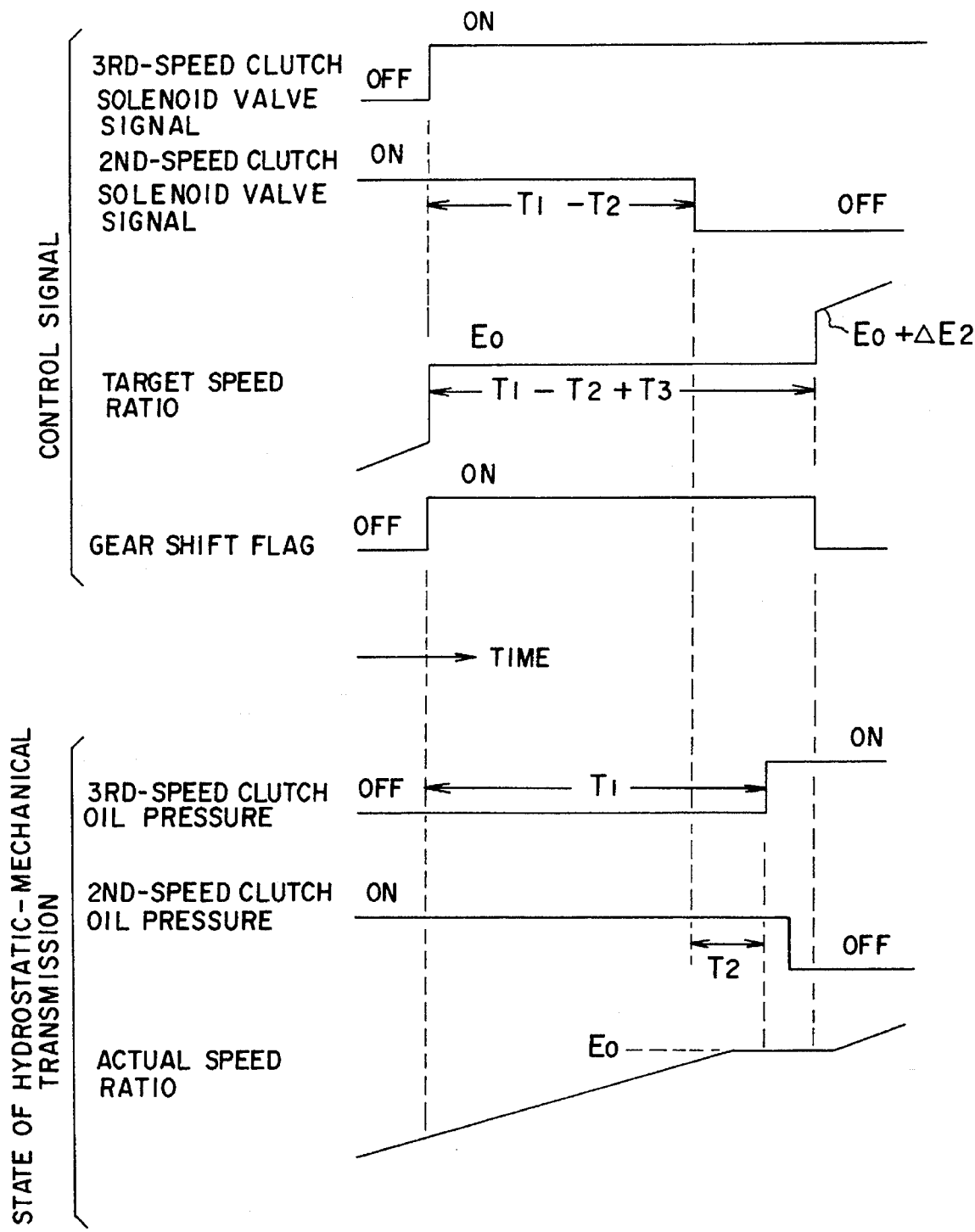
Figure 6:
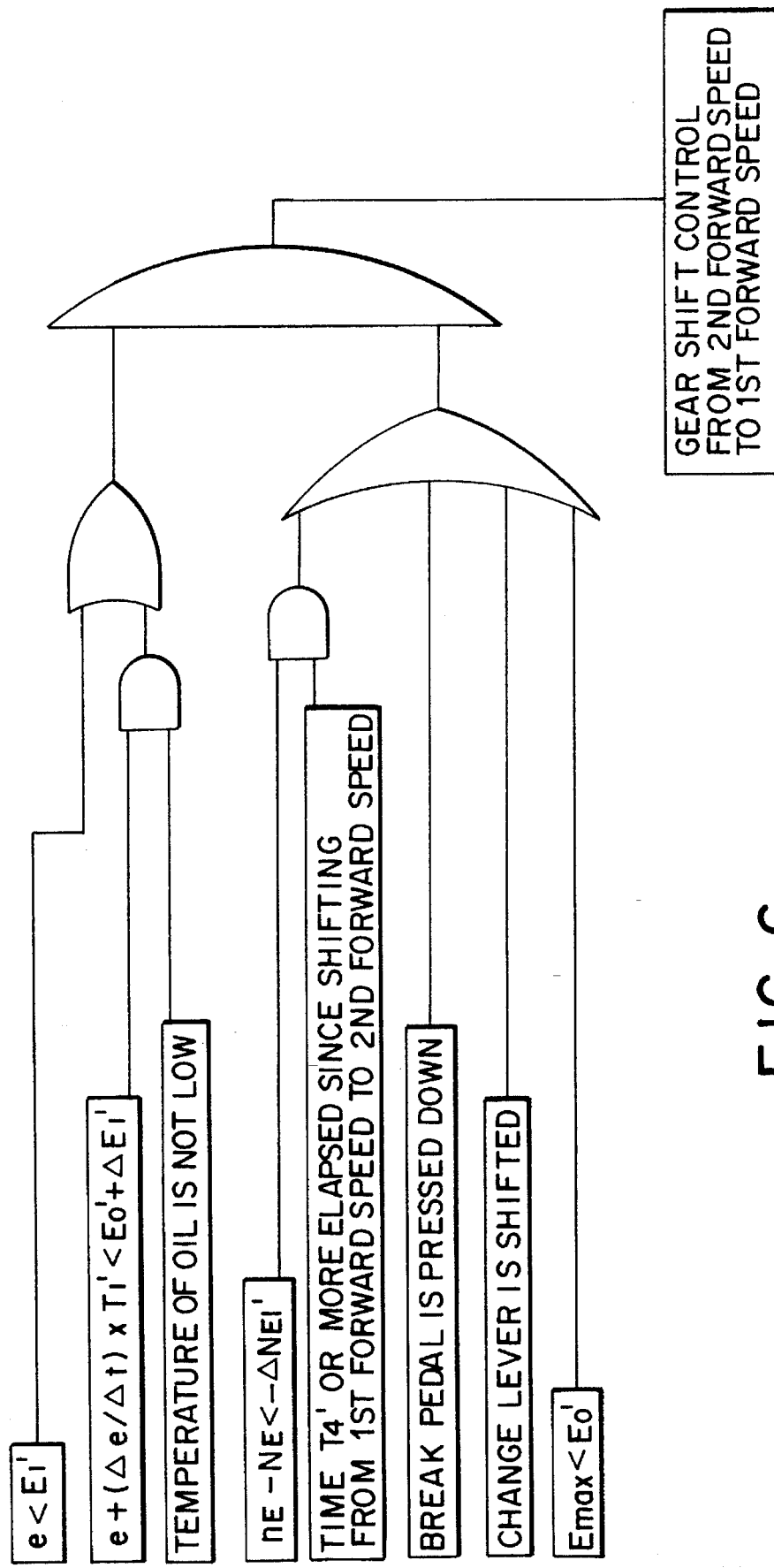
Figure 7:
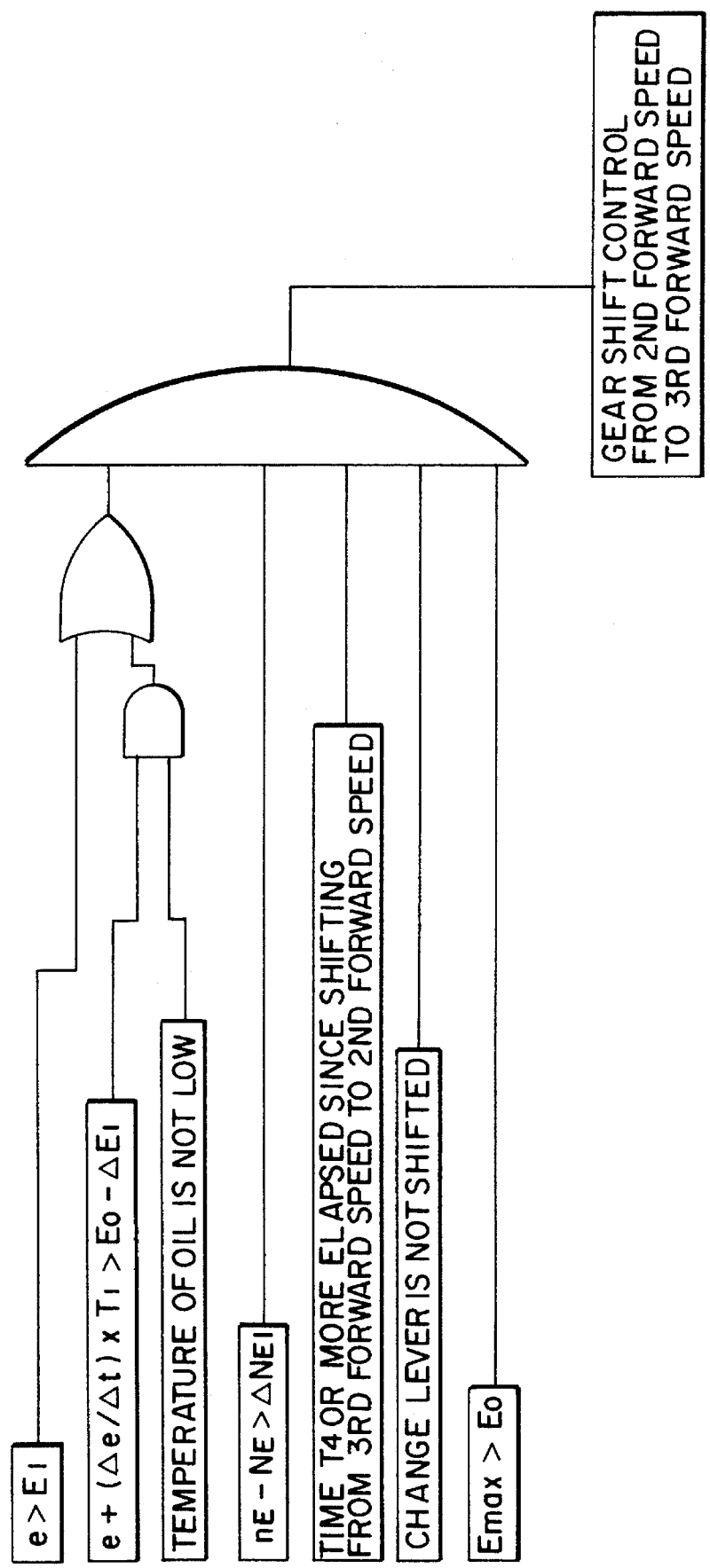

Reference will be made to the flow chart of FIG. 4, the diagrams of FIGS. 5, 6 and the time chart of FIG. 7, for describing the gear shift control performed by the speed change gear control system for a hydrostatic-mechanical transmission of the invention. Although gear shifting from 2nd forward speed (F2) to 3rd forward speed (F3) and from 2nd forward speed (F2) to 1st forward speed (F1) is mainly illustrated in the flow chart, control for shifting between other speed ranges is performed according to the same flow.

S1, S2: Various pieces of information are input by a controller 74 and then, arithmetic operation is executed for obtaining numerical values to be used for each control process.

S3, S4: These steps are for judging whether gear shift control for the vehicle has already started. If a flag (shift-down flag) for indicating that shifting to a lower speed range is underway and a flag (shift-up flag) for indicating that shifting to a higher speed range is underway have not been set, gear shift control is not being carried out, so that the steps of S5 to S27 (condition judgments for gear shift control) will be executed. If shifting to a higher speed range is underway (shift-up=1), the steps of S29 to S41 for high gear shift control (described later) will be executed. If shifting to a lower speed range is underway (shift-down=1), the steps of S42 to S54 for low gear shift control (described later) will be executed.

S5, S6: If the speed range presently selected is 2nd forward speed (F2), it is then judged whether the actual speed ratio e is more than a preset value $E_1$. This judgment is made to determine whether the gear shift control for shifting to 3rd forward speed (F3) can be started. The preset value $E_1$ is the value for a speed ratio (see FIG. 2) for the point at which the relative revolution speed of the clutch for shifting from 2nd forward speed (F2) to 3rd forward speed (F3) with respect to the disc plate is not more than a small value. The preset value $E_1$ is set such that when the clutch for shifting to 3rd forward speed (F3) is engaged without modulation of hydraulic oil, neither a breakage of the clutch nor a big shock due to speed change will occur. It will be obvious that although the cases, where either of 1st forward speed (F1), 3rd forward speed (F3), 1st reverse speed (R1), 2nd reverse speed (R2) and 3rd reverse speed (R3) is presently selected, are not described, the same flow as will be described later in the case of 2nd forward speed (F2) is applicable to these cases.

S7 to S9: If the actual speed ratio e is not more than the preset value $E_1$, a filling time $T_1$ for the 3rd-speed clutch is calculated from the engine revolution speed $n_E$. If the increasing rate $\Delta e/\Delta t$ of the speed ratio has continued for the length of the filling time $T_1$ for the 3rd-speed clutch, it is then judged whether the speed ratio exceeds a preset value $E_0 - \Delta E_1$. If the speed ratio exceeds the preset value $E_0 - \Delta E_1$, it is then judged whether the temperature of oil is low, that is, not more than a preset temperature (=operating temperature for the vehicle). If the temperature of oil is not low, the program proceeds to S10 to make other judgments for the gear shift control. On the other hand, if the temperature of oil is low, the program proceeds to S28, skipping the steps which are designed to make judgments for starting the gear shift control.

Figure 8:
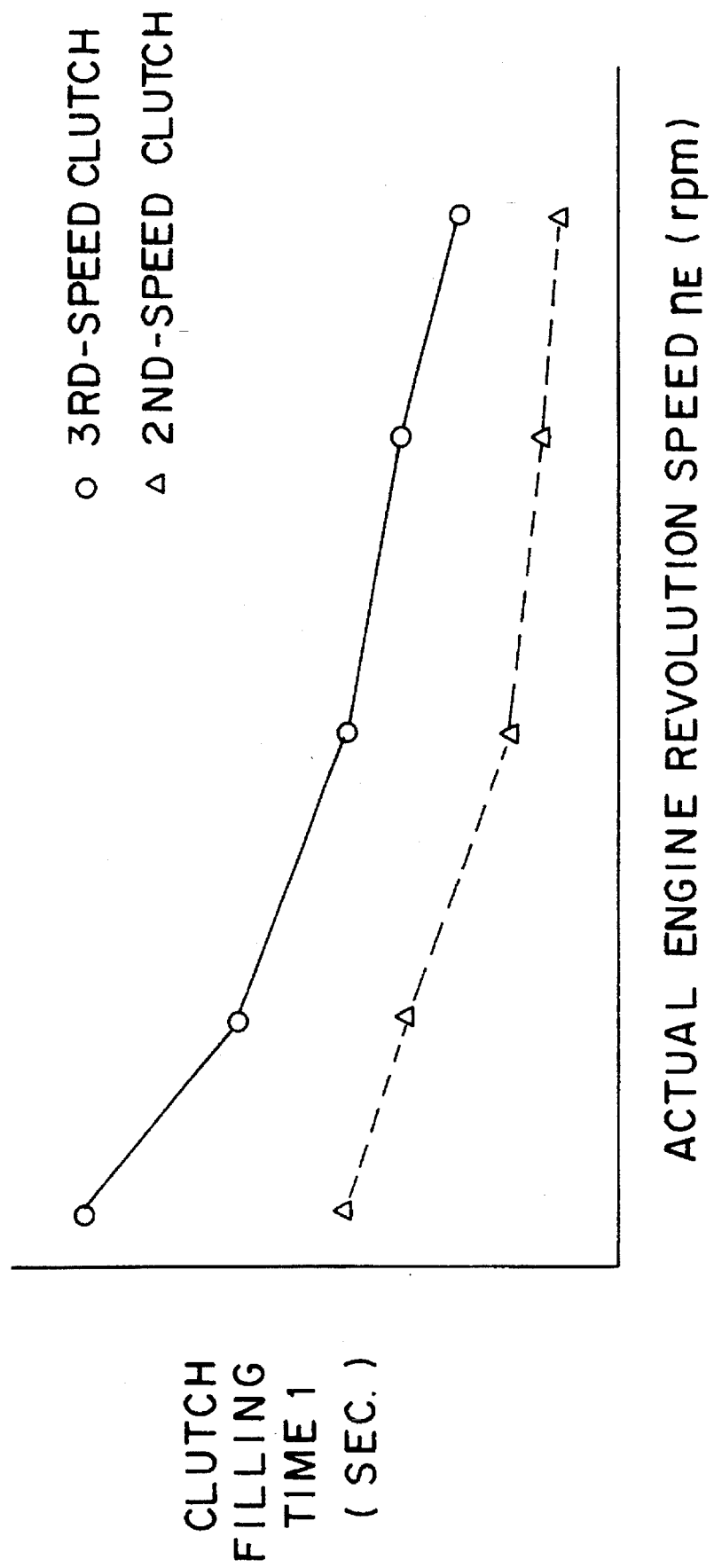

$E_0$ is the value of a speed ratio for the shifting point (point c in FIG. 2) at which the relative revolution speed of the clutch for shifting from 2nd forward speed (F2) to 3rd forward speed (F3) with respect to the disc plate is zero. $\Delta E_1$ is a predetermined small value of the speed ratio and set such that when the 3rd-speed clutch is engaged without the modulation of hydraulic oil pressure on condition that the speed ratio e is constantly equal to $E_0 - \Delta E_1$, neither a breakage of the clutch nor a big shock due to speed change will occur. The increasing rate $\Delta e/\Delta t$ of the speed ratio is calculated in such a way: For example, 10 measured values of the engine revolution speed $n_E$ and motor revolution speed $n_m$ are obtained by sampling every 10 msec. From these measured values, linear regression is obtained based on the theory of probability. Then, the increasing rate $\Delta e/\Delta t$ is calculated from the grade of the linear regression. The filling time $T_1$ which varies in accordance with the engine revolution speed $n_E$ is obtained from measurement data as shown in FIG. 8 and its values are preliminary stored in a memory in the form of a map.

As has been mentioned, when the temperature of oil is low, the judgment for the gear shift control by the calculation of the clutch filling time $T_1$ (i.e., the calculation of the equation in S8 in the flow chart) is not executed. This is because the clutch filling time $T_1$ stored in the memory is based on data sampled when the temperature of oil is high, and therefore if the clutch solenoid is actuated using such data for high temperature when the temperature of oil is low (the filling time $T_1$ is long when the temperature is low), the pressure imposed on the clutch does not rise, resulting in torque starvation. Note that when the temperature of oil is low, the vehicle is usually driven slowly by running-in, so that a big shock due to speed change will not occur even if gear shifting is performed based on only the judgment in S6.

S10 to S13: Another judgment for the gear shift control is made to determine whether there is a margin in the engine revolution speed. This condition is determined by judging whether the difference ($n_E - N_E$) between the actual engine revolution speed $n_E$ and the target engine revolution speed $N_E$ exceeds a preset value $\Delta N_{E1}$. If the difference exceeds the preset value $\Delta N_{E1}$, it is then judged whether a predetermined time $T_4$ or more has elapsed since the preceding gear shifting from 3rd forward speed (F3) to 2nd forward speed (F2) was performed, in order to prevent hunting. If the predetermined time $T_4$ or more has elapsed, it is then judged whether the forward/reverse drive change lever is operated for gear shifting between forward, neutral and reverse speed ranges. If gear shifting by the forward/reverse drive change lever is not carried out, it is then judged whether the speed ratio $E_0$ for the shifting point is smaller than the maximum speed ratio $E_{max}$.

S14, S15: If all the conditions in S10 to S13 are met, it is judged that the gear shift control for shifting from 2nd forward speed (F2) to 3rd forward speed (F3) can be started now, so that the shift-up flag is set while the shift-down flag being unset. Thereafter, the program proceeds to Step 29 for performing the high gear shift control. FIG. 5 illustrates the conditions for starting the gear shift control into the 3rd forward speed (F3) which have been described in S6 to S15.

S16: If the actual speed ratio e is not more than $E_1$ ($e \leq E_1$) and the speed ratio does not exceed the preset value $E_0 - \Delta E_1$ (i.e., $e + (\Delta e/\Delta t) \times T_1 \leq E_0 - \Delta E_1$) when the increasing rate $\Delta e/\Delta t$ of the speed ratio has continued for the length of the filling time $T_1$ for the 3rd-speed clutch, it is then judged whether the actual speed ratio e is less than a preset value $E_1'$, in order to determine whether the gear shift control for shifting to 1st forward speed (F1) can be started. The preset value $E_1'$ is the value of a speed ratio for the point at which the relative revolution speed of the clutch for shifting from 2nd forward speed (F2) to 1st forward speed (F1) with respect to the disc plate is not more than a specified small value (see FIG. 2). The preset value $E_1'$ is set such that when the clutch for shifting to 1st forward speed (F1) is engaged without the modulation of hydraulic oil, neither a breakage of the clutch nor a big shock due to speed change will occur.

S17 to S19: If the actual speed ratio e is not less than the preset value $E_1'$ ($e \geq E_1'$), the filling time $T_1'$ for the 1st-speed clutch is calculated from the engine revolution speed $n_E$, and then it is judged whether the speed ratio is less than a preset value $E_0' + \Delta E_1'$ when the decreasing rate $\Delta e/\Delta t$ ($<0$) of the speed ratio has continued for the length of the filling time $T_1'$ for the 1st-speed clutch. If the speed ratio is less than the preset value $E^{0'} + \Delta E^{1'}$, it is then judged whether the temperature of oil is low, that is, lower than the preset temperature (i.e., operating temperature for the vehicle). If the temperature is not low, the program proceeds to S20, for making another judgment for the gear shift control. On the other hand, if the temperature is low, the program proceeds to S27, skipping the steps for other judgments for the gear shift control. If the result of the judgment in S18 is NO, the program also proceeds to S27. The preset value $E_0'$ is the value of a speed ratio for the shifting point (=point a in FIG. 2) at which the relative revolution speed of the clutch for shifting from 2nd forward speed (F2) to 1st forward speed (F1) with respect to the disc plate is zero. The preset value $E_1'$ is set such that when the clutch for shifting to 1st forward speed (F1) is engaged without the modulation of hydraulic oil provided that the speed ratio e is constantly equal to $E_0' + E_1'$, neither a breakage of the clutch nor a big shock due to speed change will occur.

S20 to S24: Another judgment for the gear shift control is made to determine whether there is a margin in the engine rotation speed. This condition is determined by judging whether the difference ($n_E - N_E$) between the actual engine revolution speed $n_E$ and the target engine revolution speed $N_E$ is less than a preset value $-\Delta N_{E1}$. If the difference is less than the preset value $-\Delta N_{E1}$, it is then judged whether a predetermined time $T_4'$ or more has elapsed since the preceding gear shifting from 1st forward speed (F1) to 2nd forward speed (F2) was performed, in order to prevent hunting. If either of the above two conditions is not met, it is then judged whether the brake pedal is pressed down. If the brake pedal is not pressed down, it is then judged whether the forward/reverse drive change lever is operated for gear shifting between forward, neutral and reverse speed ranges. If gear shifting by the forward/reverse drive change lever is not carried out, it is then judged whether the maximum speed ratio $E_{max}$ for the shifting point has been made to be smaller than the speed ratio $E_0'$ by the operation of the speed ratio lever etc.

S25 to S26: If $n_E - N_E < -\Delta N_{E1}$ is satisfied and the predetermined time $T_4'$ or more has elapsed since the preceding gear shifting from 1st forward speed (F1) to 2nd forward speed (F2) was performed, it is judged that the gear shift control for shifting from 2nd forward speed (F2) to 1st forward speed (F1) can be performed. Even if either or both of these conditions are not satisfied, the gear shift control from 2nd forward speed (F2) to 1st forward speed (F1) can be performed, provided that one of the following conditions is satisfied: (i) the brake pedal is pressed down; (ii) the forward/reverse drive change lever is operated; and (iii) $E_{max} < E_0'$. After it has been determined that the gear shift control can be started, the shift-down flag is set while the shift-up flag being unset, and the program proceeds to S42 for performing the low gear shift control. FIG. 6 illustrates the conditions for starting the gear shift control for shifting to 1st forward speed (F1), which have been explained in S16 to S26.

S27, S28: If none of the conditions in S20 to S24 is satisfied, or if neither $e < E_1'$ nor $e + (\Delta e/\Delta t) \times T_1' < E_0' + \Delta E_1'$ is satisfied, or if $e + (\Delta e/\Delta t) \times T_1' < E_0' + \Delta E_1'$ is satisfied but the temperature of oil is low, the conditions for starting the gear shift control are not met, so that both the shift-up flag and the shift-down flag are unset and speed ratio control other than the gear shift control is performed. Thereafter, the program returns to S1.

S29 to S30: If a gear shift flag indicative of gear shifting from 2nd forward speed (F2) to 3rd forward speed (F3) is not set at the time the high gear shift control starts, a signal for instructing turning ON of a 3rd-speed clutch solenoid is generated and the gear shift flag is set. At the same time, processes for setting the target speed ratio E to $E_0$ are performed. On the other hand, if the gear shift flag is set, the above processes are skipped.

S31 to S34: If the temperature of oil is not low, a signal for instructing turning OFF of a 2nd-speed clutch solenoid is generated after elapse of a time $T_1 - T_2$ ($0 \leq T_2 \leq T_1$). It will be understood from FIG. 5 that the actual speed ratio e approaches $E_0$ during the time $T_1 - T_2$ and that the 3rd-speed clutch is engaged at the time $T_1$, thereby increasing hydraulic oil pressure for the 3rd-speed clutch. On the other hand, if the temperature of oil is low, it is determined whether the condition represented by $|E_0 - e| < \epsilon$ ($\epsilon$=a small value) has continued for a predetermined time. If so, it is judged that the 2nd-speed clutch and 3rd-speed clutch are both engaged. Therefore, a signal for instructing turning OFF of the 2nd-speed clutch solenoid is generated.

S35 to S37: When a time $T_1-T_2+T_3$ has elapsed since the gear shift flag was set from 2nd forward speed (F2) to 3rd forward speed (F3), the target speed ratio E is stepped up to $E_0+\Delta E_2$. Meanwhile, the gear shift flag (F2→F3) and the shift-up flag are unset, thereby terminating the gear shift control. Note that, in an actual control process, the disengagement of the 2nd-speed clutch and shifting to 3rd speed do not always happen upon completion of the gear shift control but take place at the time when hydraulic oil pressure for the 2nd-speed clutch solenoid drops. However, there is no problem as far as the time gap is small. In addition, the actual speed ratio e becomes equal to $E_0$ before the engagement of the 3rd-speed clutch so that the 3rd-speed clutch can be engaged without a shock.

The reason why the target speed ratio E is stepped up to $E_0+\Delta E_2$ after the elapse of the time $T_1-T_2+T_3$ will be explained below.

Figure 9:
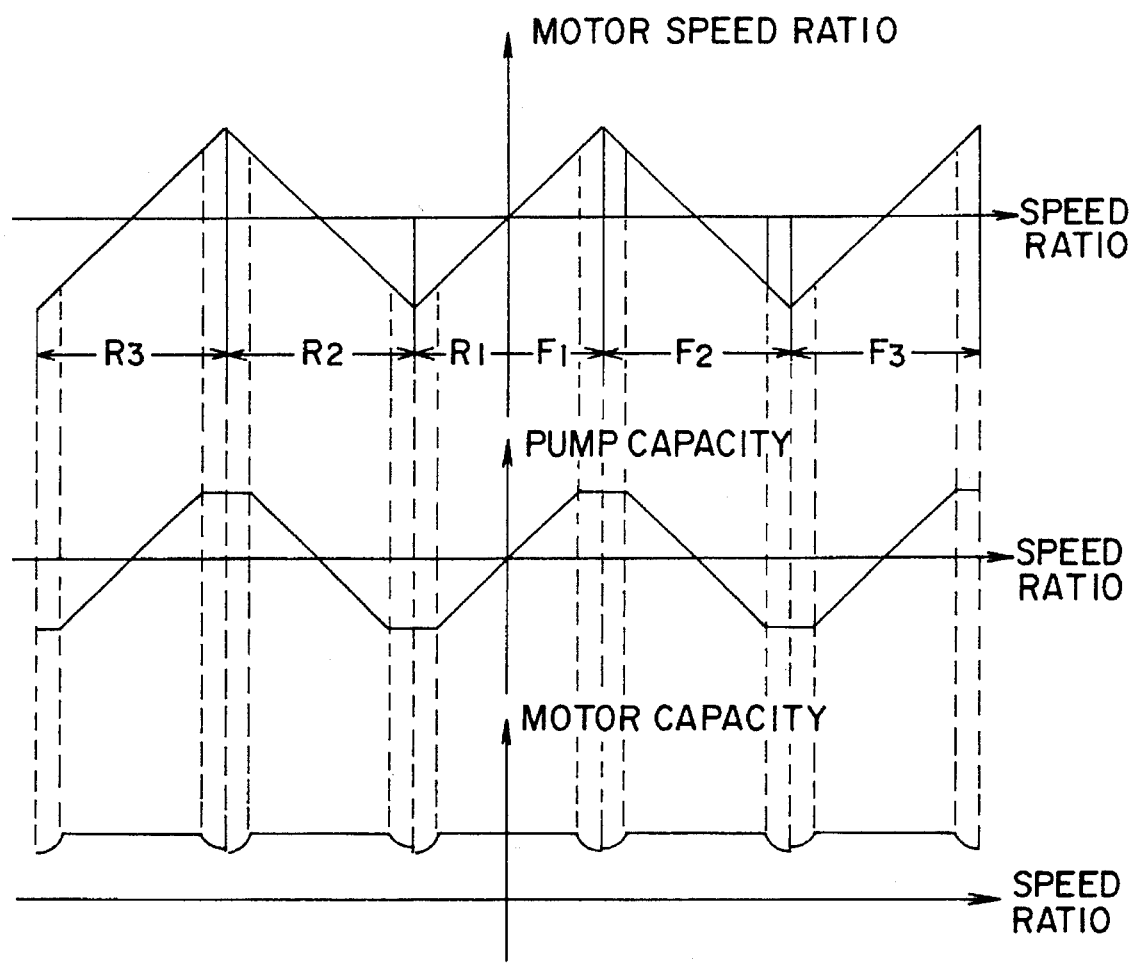

The variable displacement motor 53 changes its operation from motor operation to pump operation by, for example, gear shifting from 2nd forward speed (F2) to 3rd forward speed (F3). Before changing the operation, the variable displacement motor 53 is in such a condition that the angle of the displacement setting variable-angle swash plate 53a is excessively reduced by such an amount as to accommodate a decrease in the volume efficiency of the variable displacement motor 53. If the variable displacement motor 53 in the above condition is switched from motor operation to pump operation without changing the revolution speed and discharge volume when it functions as a motor, the discharge of the variable displacement motor 53 which is now working as a pump will decrease by the amount of decrease in volume efficiency. As a result, output revolution speed decreases and a shock due to speed change occurs. In order to solve this problem, the capacity of the variable displacement motor 53 is changed at the shifting point and the discharge of the motor 53 is corrected without changing its revolution speed, as shown in FIG. 9. This is instructed in the form of a speed ratio in an actual control process, and therefore the target speed ratio E is incremented by $\Delta E_2$. The occurrence of a shock due to speed change can be accordingly avoided, and when shifting gears, clutch engagement can be carried out with the relative revolution speed of the clutch with respect to the disc being zero so that the heat load imposed on the clutch can be restricted.

S38 to S41: If the actual engine revolution speed $n_E$ drops below the target engine revolution speed $N_E$ by more than a preset value $\Delta N_{E2}$ ($n_E<N_E-\Delta N_{E2}$) owing to the fluctuation of load etc. during the elapse time $T_1-T_2$, or if the forward/reverse drive change lever is operated, a signal for instructing turning OFF of the 3rd-speed clutch solenoid is generated. In the meantime, the gear shift flag (F2→F3) and the shift-up flag are unset, thereby interrupting the gear shift control.

S42, S43: If the gear shift flag indicative of shifting from 2nd forward speed (F2) to 1st forward speed (F1) is not set at the time the low gear shift control starts, a signal for instructing turning ON of the 1st-speed clutch solenoid is generated and the gear shift flag is set. Meanwhile, processes for setting the target speed ratio E to $E_0'$ are executed. On the other hand, if the gear shift flag is set, the above processes will be skipped.

S44 to S47: If the temperature of oil is not low, a signal for instructing turning OFF of the 2nd-speed clutch solenoid is generated after elapse of a time $T_1'-T_2'(0 \leq T_2' \leq T_1')$. The speed ratio e approaches $E_0'$ during the time $T_1'-T_2'$ and at the time $T_1'$, the 1st-speed clutch is engaged, thereby increasing hydraulic oil pressure for the 1st-speed clutch. On the other hand, if the temperature of oil is low, it is determined whether the condition represented by $|E_0'-e|<\epsilon$ ($\epsilon$=a small value) has continued for a predetermined time. If so, it is judged that the 2nd-speed clutch and 1st-speed clutch are both engaged. Therefore, a signal for instructing turning OFF of the 2nd-speed clutch solenoid is generated.

S48 to S50: When a time $T_1'-T_2'+T_3'$ has elapsed since the gear shift flag was set from 2nd forward speed (F2) to 1st forward speed (F1), the target speed ratio E is stepped down to $E_0-\Delta E_2'$, like the high gear shift control. Meanwhile, the gear shift flag (F2→F1) and the shift-down flag are unset, thereby terminating the gear shift control. Note that, in an actual control process, the disengagement of the 2nd-speed clutch and shifting to 1st-speed do not always happen upon completion of the gear shift control but take place at the time when hydraulic oil pressure for the 2nd-speed clutch solenoid drops. However, there is no problem as far as the time gap is small. In addition, the actual speed ratio e becomes equal to $E_0'$ before the engagement of the 1st-speed clutch so that the 1st-speed clutch can be engaged without a shock.

S51 to S54: If the actual engine revolution speed $n_E$ exceeds the target engine revolution speed $N_E$ by more than a preset value $\Delta N_{E2}'$ ($n_E>N_E+\Delta N_{E2}'$) owing to the fluctuation of load etc. during the elapse of the time $T_1'-T_2'$, or if the forward/reverse drive change lever is operated, a signal for instructing turning OFF of the 1st-speed clutch solenoid is generated. Meanwhile, the gear shift flag (F2→F1) and the shift-down flag are unset, thereby interrupting the gear shift control.

In the speed change gear control system of this embodiment, the increasing and decreasing rates of the speed ratio e are obtained, and then clutch shifting control is performed when the relative revolution speed of the clutch to be engaged is in close proximity to 0 rpm during the filling time. The speed ratio is varied during the filling time of hydraulic oil as well, and the presently engaged clutch is disengaged at the same time judgment for the engagement of the next clutch is made. With this arrangement, gear shifting can be carried out while the vehicle being accelerated or decelerated, so that the interrupting time of acceleration or deceleration can be minimized.

Judgment for clutch engagement is made by the clutch filling time and by the clutch shift control, so that there is no need to use hydraulic switches for the gear shifting which are susceptible to breakdown.

Further, the target revolution speed ratio is stepped up or down just after completion of gear shifting, and therefore the discharge volume of the pump after gear shifting can be adjusted in a short time such that the engine can be appropriately driven. This positively prevents the occurrence of a shock due to speed change at the time of gear shifting.

Gear shifting is prohibited for a specified time after the preceding gear shifting has been completed, and the gear shift control starts after judging from the revolution speed of the engine whether acceleration or deceleration should be carried out. In addition, the gear shift control can be interrupted after starting, according to judgment on the revolution speed of the engine and on the shift condition of gear change levers. With this arrangement, not only hunting but also undesirable time losses during gear shifting can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A speed change gear control system for use in a hydrostatic-mechanical transmission which is equipped with a mechanical transmission unit actuated through an input shaft connectable to a power source; a hydrostatic transmission unit which is connectable to the input shaft and comprises a pump and motor having their respective discharge setting swash plates, the angle of at least either of the swash plates being variable; and a differential unit for actuating both the mechanical transmission unit and the hydrostatic transmission unit by connecting an output shaft thereto, the system comprising:

shift control means for performing gear shifting for shifting the transmission from an arbitrary speed range into a higher speed range which provides higher absolute speed than the arbitrary speed range, provided that the actual speed ratio e of the transmission satisfies $|E_0|>|e|>|E|$ where $E_0$ is a speed ratio for a shifting point at which the transmission is shifted from the arbitrary speed range into the higher speed range; and $E_1$ is a speed ratio in proximity to the speed ratio $E_0$, which is for a point at which the relative revolution speed of a clutch with respect to a disc plate is not more than a specified small value.

2. A speed change gear control system for use in a hydrostatic-mechanical transmission which is equipped with a mechanical transmission unit actuated through an input shaft connectable to a power source; a hydrostatic transmission unit which is connectable to the input shaft and comprises a pump and motor having their respective discharge setting swash plates, the angle of at least either of the swash plates being variable; and a differential unit for actuating both the mechanical transmission unit and the hydrostatic transmission unit by connecting an output shaft thereto, the system comprising:

shift control means for performing gear shifting for shifting the transmission from an arbitrary speed range into a higher speed range which provides higher absolute speed than the arbitrary speed range, provided that $|e|+(\Delta e/\Delta t)\times T_1 > |E_0|-\Delta E_1$, where $\Delta e$ ($\Delta e>0$) is an increase in the absolute value of the actual speed ratio e of the transmission over a period of time $\Delta t$; $T_1$ is a filling time required for supplying hydraulic oil to a clutch which shifts the transmission from the arbitrary speed range to the higher speed range; and $\Delta E_1$ is a specified small speed ratio.

3. A speed change gear control system for use in a hydrostatic-mechanical transmission which is equipped with a mechanical transmission unit actuated through an input shaft connectable to a power source; a hydrostatic transmission unit which is connectable to the input shaft and comprises a pump and motor having their respective discharge setting swash plates, the angle of at least either of the swash plates being variable; and a differential unit for actuating both the mechanical transmission unit and the hydrostatic transmission unit by connecting an output shaft thereto, the system comprising:

shift control means for performing gear shifting for shifting the transmission from an arbitrary speed range into a higher speed range which provides higher absolute speed than the arbitrary speed range, provided that the actual speed ratio e of the transmission satisfies $|E_0|>|e|>|E_1|$, where $E_0$ is a speed ratio for a shifting point at which the transmission is shifted from the arbitrary speed range into the higher speed range; and $E_1$ is a speed ratio in proximity to the speed ratio $E_0$, which is for a point at which the relative revolution speed of a clutch with respect to a disc plate is not more than a specified small value, or provided that $|e|+(\Delta e/\Delta t)\times T_1 > |E_0|-\Delta E_1$, where $\Delta e$ ($\Delta e>0$) is an increase in the absolute value of the actual speed ratio e of the transmission over a period of time $\Delta t$; $T_1$ is a filling time required for supplying hydraulic oil to a clutch which shifts the transmission from the arbitrary speed range to the higher speed range; and $\Delta E_1$ is a specified small speed ratio.

4. The speed change gear control system as claimed in claim 3, wherein the shift control means performs gear shifting if the difference ($n_E-N_E$) between an actual engine revolution speed and target engine revolution speed $N_E$ exceeds a preset value $\Delta N_{E1}$.

5. The speed change gear control system as claimed in claim 4, wherein the shift control means performs gear shifting if the elapsed time since shifting from the higher speed range to the arbitrary speed range is not less than a preset value $T_4$.

6. The speed change gear control system as claimed in claim 5, wherein the shift control means performs gear shifting if a forward/reverse drive change lever is not operated to shift the transmission between forward, neutral and reverse speed ranges.

7. The speed change gear control system as claimed in claim 6, wherein the shift control means performs gear shifting if the speed ratio $E_0$ is below a maximum speed ratio $E_{max}$.

8. The speed change gear control system as claimed in any one of claims 1 to 7, wherein during the shifting from the arbitrary speed range to the higher speed range, the shift control means keeps a clutch for the arbitrary speed range in its engaged state while generating a signal for instructing the engagement of a clutch for the higher speed range, and at the same time, the shift control means increases a target speed ratio E so as to be equal to the speed ratio $E_0$ and generates a signal for instructing the disengagement of the clutch for the arbitrary speed range after elapse of a time $T_1-T_2$, where $0 \leq T_2 < T_1$.

9. The speed change gear control system as claimed in claim 8, wherein during the shifting from the arbitrary speed range to the higher speed range, the shift control means stops the generation of a signal for instructing the engagement of the clutch for the higher speed range, if the actual engine revolution speed drops below the target engine revolution speed by more than a preset value during a period of time $T_1-T_2$, or if the forward/reverse drive change lever has been operated for gear shifting.

10. The speed change gear control system as claimed in claim 1, wherein when the temperature of hydraulic oil is not higher than operating temperature for the vehicle, the shift control means performs control in such a way that during the shifting from the arbitrary speed range to the higher speed range, the shift control means keeps a clutch for the arbitrary speed range in its engaged state while generating a signal for instructing the engagement of a clutch for the higher speed range and generates a signal for instructing the disengagement of the clutch for the arbitrary speed range if a condition, in which the difference between the speed ratios e and $E_0$ is not more than a specified small value, has continued for a predetermined time.

11. A speed change gear control system for use in a hydrostatic-mechanical transmission which is equipped with a mechanical transmission unit actuated through an input shaft connectable to a power source; a hydrostatic transmission unit which is connectable to the input shaft and comprises a pump and motor having their respective discharge setting swash plates, the angle of at least either of the swash plates being variable; and a differential unit for actuating both the mechanical transmission unit and the hydrostatic transmission unit by connecting an output shaft thereto, the system comprising:

shift control means for performing gear shifting for shifting the transmission from an arbitrary speed range into a lower speed range which provides lower absolute speed than the arbitrary speed range, provided that the actual speed ratio e of the transmission satisfies $|E_1'|>|e|>|E_0'|$, is $E_0'$ speed ratio for a shifting point at which the transmission is shifted from the arbitrary speed range into the lower speed range; and $E_1'$ is a speed ratio in proximity to the speed ratio $E_0'$, which is for a point at which the relative revolution speed of a clutch with respect to a disc plate is not more than a specified small value.

12. A speed change gear control system for use in a hydrostatic-mechanical transmission which is equipped with a mechanical transmission unit actuated through an input shaft connectable to a power source; a hydrostatic transmission unit which is connectable to the input shaft and comprises a pump and motor having their respective discharge setting swash plates, the angle of at least either of the swash plates being variable; and a differential unit for actuating both the mechanical transmission unit and the hydrostatic transmission unit by connecting an output shaft thereto, the system comprising:

shift control means for performing gear shifting for shifting the transmission from an arbitrary speed range into a lower speed range which provides lower absolute speed than the arbitrary speed range, provided that $|e|+(\Delta e/\Delta t)\times T_1'<|E_0'|+\Delta E_1'$, where $\Delta e$ ($\Delta e<0$) is a decrease in the absolute value of the actual speed ratio e of the transmission over a period of time $\Delta t$; $T_1'$ is a filling time required for supplying hydraulic oil to a clutch which shifts the transmission from the arbitrary speed range to the lower speed range; and $\Delta E_1'$ is a specified small speed ratio.

13. A speed change gear control system for use in a hydrostatic-mechanical transmission which is equipped with a mechanical transmission unit actuated through an input shaft connectable to a power source; a hydrostatic transmission unit which is connectable to the input shaft and comprises a pump and motor having their respective discharge setting swash plates, the angle of at least either of the swash plates being variable; and a differential unit for actuating both the mechanical transmission unit and the hydrostatic transmission unit by connecting an output shaft thereto, the system comprising:

shift control means for performing gear shifting for shifting the transmission from an arbitrary speed range into a lower speed range which provides lower absolute speed than the arbitrary speed range, provided that the actual speed ratio e of the transmission satisfies $|E_1'|>|e|>|E_0'|$, where $E_0'$ is a speed ratio for a shifting point at which the transmission is shifted from the arbitrary speed range into the lower speed range; and $E_1'$ is a speed ratio in proximity to the speed ratio $E_0'$, which is for a point at which the relative revolution speed of a clutch with respect to a disc plate is not more than a specified small value, or provided that $|e|+(\Delta e/\Delta t)\times T_1'>|E_0'|+\Delta E_1'$, where $\Delta e$ ($\Delta e<0$) is a decrease in the absolute value of the actual speed ratio e of the transmission over a period of time $\Delta t$; $T_1'$ is a filling time required for supplying hydraulic oil to a clutch which shifts the transmission from the arbitrary speed range to the lower speed range; and $\Delta E_1'$ is a specified small speed ratio.

14. The speed change gear control system as claimed in claim 13, wherein the shift control means performs gear shifting if the difference ($n_E-N_E$) between an actual engine revolution speed $n_E$ and target engine revolution speed $N_E$ is below a preset value $-\Delta N_{E1}'$.

15. The speed change gear control system as claimed in claim 14, wherein the shift control means performs gear shifting if the elapsed time since shifting from the lower speed range to the arbitrary speed range is not less than a preset value $T_4'$.

16. The speed change gear control system as claimed in claim 15, wherein the shift control means performs gear shifting if a brake pedal is pressed down.

17. The speed change gear control system as claimed in claim 16, wherein the shift control means performs gear shifting if a forward/reverse drive change lever is operated to shift the transmission between forward, neutral and reverse speed ranges.

18. The speed change gear control system as claimed in claim 17, wherein the shift control means performs gear shifting if a maximum speed ratio $E_{max}$ is below the speed ratio $E_0'$.

19. The speed change gear control system as claimed in any one of claims 11 to 18, wherein during the shifting from the arbitrary speed range to the lower speed range, the shift control means keeps a clutch for the arbitrary speed range in its engaged state while generating a signal for instructing the engagement of a clutch for the lower speed range, and at the same time, the shift control means decreases a target speed ratio E so as to be equal to the speed ratio $E^{0'}$ and generates a signal for instructing the disengagement of the clutch for the arbitrary speed range after elapse of a time $T_1'-T_2'$, where $0 \leq T_2' < T_1'$.

20. The speed change gear control system as claimed in claim 19, wherein during the shifting from the arbitrary speed range to the lower speed range, the shift control means stops the generation of a signal for instructing the engagement of the clutch for the lower speed range, if the actual engine revolution speed exceeds the target engine revolution speed by more than a preset value, during a period of time $T_1'-T_2'$, or if the forward/reverse drive change lever has been operated for gear shifting.

21. The speed change gear control system as claimed in claim 11, wherein when the temperature of hydraulic oil is not higher than operating temperature for the vehicle, the shift control means performs control in such a way that, during the shifting from the arbitrary speed range to the lower speed range, the shift control means keeps a clutch for the arbitrary speed range in its engaged state while generating a signal for instructing the engagement of a clutch for the lower speed range and generates a signal for instructing the disengagement of the clutch for the arbitrary speed range if a condition, in which the difference between the speed ratios e and $E^{0'}$ is not more than a small value, has continued for a predetermined time.

\* \* \* \* \*